(12) United States Patent
Kottke et al.

(10) Patent No.: US 11,350,105 B2
(45) Date of Patent: May 31, 2022

(54) SELECTION OF VIDEO QUALITY METRICS AND MODELS TO OPTIMIZE BITRATE SAVINGS IN VIDEO ENCODING APPLICATIONS

(71) Applicant: Euclid Discoveries, LLC, Burlington, MA (US)

(72) Inventors: Dane P. Kottke, Durham, NC (US); Katherine H. Cornog, Medford, MA (US); John J. Guo, Arcadia, CA (US); Myo Tun, McKinney, TX (US); Jeyun Lee, San Jose, CA (US); Nigel Lee, Chestnut Hill, MA (US)

(73) Assignee: Euclid Discoveries, LLC, Burlington, MA (US)

( * ) Notice: Subject to any disclaimer, the term of this patent is extended or adjusted under 35 U.S.C. 154(b) by 0 days.

(21) Appl. No.: 17/144,924

(22) Filed: Jan. 8, 2021

(65) Prior Publication Data

US 2021/0203951 A1 Jul. 1, 2021

Related U.S. Application Data

(63) Continuation of application No. 16/926,089, filed on Jul. 10, 2020, which is a continuation of application
(Continued)

(51) Int. Cl.
*H04N 19/146* (2014.01)
*H04N 19/124* (2014.01)
(Continued)

(52) U.S. Cl.
CPC ......... *H04N 19/146* (2014.11); *G06T 7/0002* (2013.01); *H04N 19/115* (2014.11);
(Continued)

(58) Field of Classification Search
CPC . G06T 2207/10016; G06T 2207/20081; G06T 2207/30168; G06T 7/0002;
(Continued)

(56) References Cited

U.S. PATENT DOCUMENTS

| 9,615,098 B1 | 4/2017 | Yi et al. |
| 10,003,799 B2 | 6/2018 | Carmel et al. |

(Continued)

FOREIGN PATENT DOCUMENTS

| CN | 104361593 A | 2/2015 |
| WO | 2008081185 A2 | 7/2008 |
| WO | 2018140158 A1 | 8/2018 |

OTHER PUBLICATIONS

Zhang et al., Determining optimal configuration of video encoding parameters using numerical search algorithms, 2008, Proc. SPIE 6822, Visual Communications and Image Processing (Year: 2008).*

(Continued)

*Primary Examiner* — Francis Geroleo
(74) *Attorney, Agent, or Firm* — Hamilton, Brook, Smith & Reynolds, P.C.

(57) ABSTRACT

Videos may be characterized by objective metrics that quantify video quality. Embodiments are directed to target bitrate prediction methods in which one or more objective metrics may serve as inputs into a model that predicts a mean opinion score (MOS), a measure of perceptual quality, as a function of metric values. The model may be derived by generating training data through conducting subjective tests on a set of video encodings, obtaining MOS data from the subjective tests, and correlating the MOS data with metric measurements on the training data. The MOS predictions may be extended to predict the target (encoding) bitrate that achieves a desired MOS value. The target bitrate prediction methods may be applied to segments of a video. The methods may be made computationally faster by applying
(Continued)

temporal subsampling. The methods may also be extended for adaptive bitrate (ABR) applications by applying scaling factors to predicted bitrates at one frame size to determine predicted bitrates at different frame sizes. A dynamic scaling algorithm may be used to determine predicted bitrates at different frame sizes.

26 Claims, 7 Drawing Sheets

Related U.S. Application Data

No. 16/420,796, filed on May 23, 2019, now Pat. No. 10,757,419, which is a continuation-in-part of application No. PCT/US2017/067413, filed on Dec. 19, 2017.

(60) Provisional application No. 62/452,265, filed on Jan. 30, 2017.

(51) Int. Cl.
*H04N 19/172* (2014.01)
*H04N 19/50* (2014.01)
*H04N 19/192* (2014.01)
*H04N 19/179* (2014.01)
*H04N 19/115* (2014.01)
*H04N 19/154* (2014.01)
*G06T 7/00* (2017.01)

(52) U.S. Cl.
CPC ......... *H04N 19/124* (2014.11); *H04N 19/154* (2014.11); *H04N 19/172* (2014.11); *H04N 19/179* (2014.11); *H04N 19/192* (2014.11); *H04N 19/50* (2014.11); *G06T 2207/10016* (2013.01); *G06T 2207/20081* (2013.01); *G06T 2207/30168* (2013.01)

(58) Field of Classification Search
CPC .. H04N 19/115; H04N 19/124; H04N 19/146; H04N 19/154; H04N 19/172; H04N 19/179; H04N 19/192; H04N 19/50
See application file for complete search history.

(56) References Cited

U.S. PATENT DOCUMENTS

| | | | |
|---|---|---|---|
| 10,091,507 B2 | 10/2018 | Lee et al. | |
| 10,390,071 B2 | 8/2019 | Sethuraman et al. | |
| 10,595,028 B2* | 3/2020 | Koren | H04N 19/115 |
| 10,757,419 B2 | 8/2020 | Kottke et al. | |
| 10,869,048 B2 | 12/2020 | Mao et al. | |
| 11,159,801 B2 | 10/2021 | Kottke et al. | |
| 11,228,766 B2 | 1/2022 | Kottke et al. | |
| 2006/0222078 A1 | 10/2006 | Raveendran | |
| 2013/0027568 A1* | 1/2013 | Zou | H04N 17/004 348/192 |
| 2014/0375756 A1 | 12/2014 | Yang et al. | |
| 2015/0271496 A1* | 9/2015 | Choi | H04N 19/154 375/240.03 |
| 2016/0014418 A1* | 1/2016 | Shao | H04N 19/115 375/240.02 |
| 2018/0109823 A1 | 4/2018 | Yang et al. | |
| 2019/0289296 A1 | 9/2019 | Kottke et al. | |
| 2020/0413067 A1 | 12/2020 | Kottke et al. | |
| 2021/0203950 A1 | 7/2021 | Kottke et al. | |

OTHER PUBLICATIONS

Notice of Allowance for U.S. Appl. No. 17/143,929, entitled "Dynamic Scaling for Consistent Video Quality in Multi-frame Size Encoding," dated Sep. 24, 2021.

Non-Final Rejection for U.S. Appl. No. 16/926,089, "Video Characterization for Smart Encoding Based on Perceptual Quality Optimization," dated May 12, 2021.

Notice of Allowance for U.S. Appl. No. 16/926,089, "Video Characterization for Smart Encoding Based on Perceptual Quality Optimization," dated Jul. 8, 2021.

Corrected Notice of Allowance for U.S. Appl. No. 16/926,089, "Video Characterization for Smart Encoding Based on Perceptual Quality Optimization," dated Sep. 28, 2021.

Notification of Transmittal of the International Search Report and Written Opinion of the International Searching Authority for Application No. PCT/US2017/067413, "Video Characterization for Smart Encoding Based on Perceptual Quality Optimization," dated May 16, 2018.

International Preliminary Report on Patentability for International Application No. PCT/US2017/067413, "Video Characterization for Smart Encoding Based on Perceptual Quality Optimization," dated Aug. 8, 2019.

Xue, W. et al., "Gradient Magnitude Similarity Deviation: A Highly Efficient Perceptual Image Quality Index," IEEE Transactions on Image Processing, vo 1 • 23, No. 2, Feb. 1, 2014 (Feb. 1, 2014), pp. 684-695, XP011536508, ISSN: 1057-7149, DOI: 10.1109/TIP.2013.2293423 [retrieved on Dec. 24, 2013].

Yan, P. et al., "Video Quality Assessment via Gradient Magnitude Similarity Deviation of Spatial and Spatiotemporal Slices," Proceedings Optical Diagnostics of Living Cells II, vol. 9411, Mar. 11, 2015 (Mar. 11, 2015), p. 94110M, XP055456389, US, ISSN: 0277-786X, DOI: 10.1117/12.2083283 ISBN: 978-1-5106-1324-9.

Sheikh, H.R. et al., "A Statistical Evaluation of Recent Full Reference Image Quality Assessment Algorithms," IEEE Transactions on Image Processing, vol. 15, No. 11, Nov. 1, 2006 (Nov. 1, 2006), pp. 3440-3451, XP055170592, ISSN: 1057-7149, DOI: 10.1109/TIP.2006.881959 section III.A.

Notice of Allowance and Fee(s) Due for U.S. Appl. No. 16/420,796, "Video Characterization for Smart Encoding Based on Perceptual Quality Optimization," dated Jun. 4, 2020.

Tourapis, A.; "Enhanced predictive zonal search for single and multiple frame motion estimation," Proc. SPIE 4671, Visual Communications and Image Processing, pp. 1069-1078, 2002.

Yang, X. et al., "Motion-compensated residue processing in video coding based on just-noticeable-distortion profile," IEEE Trans. on Circuits, Systems, and Video Technology, 15(6):742-752, 2005.

Wang, Z. et al., "Image quality assessment: From error visibility to structural similarity," IEEE. Trans. on Image Processing, 13(4):600-612, 2004.

Xu, S. et al., "Multi-output least-squares support vector regression machines," Pattern Recognition Letters, 34(9):1078-1084, 2013.

Garrett-Glaser, J.; "A novel macroblock-tree algorithm for high performance optimization of dependent video coding in H.264/AVC," unpublished, 2007; http://x264.nl/developers/Dark_Shikari/MBtree%20paper.pdf.

Li, Z. et al., "Toward a practical perceptual video quality metric," 2016, http://techblog.netflix.com/2016/06/toward-practical-perceptual-video.html.

Le Callet, P. et al., "A convolutional neural network approach for objective video quality assessment," IEEE Trans. on Neural Networks, 17(5):1316-1327, 2006.

Pati, Y. et al., "Orthogonal matching pursuit: Recursive function approximation with applications to wavelet decomposition," in Proc. of the 27th Asilomar Conference, 40-44, 1993.

Norkin, A. et al., "More efficient mobile encodes for Netflix downloads," Dec. 1, 2016, http://techblog.netflix.com/2016/12/more-efficient-mobile-encodes-for.html.

* cited by examiner

SELECTION OF VIDEO QUALITY METRICS AND MODELS TO OPTIMIZE BITRATE SAVINGS IN VIDEO ENCODING APPLICATIONS

RELATED APPLICATIONS

This application is a continuation of U.S. application Ser. No. 16/926,089, filed Jul. 10, 2020, which is a continuation of U.S. application Ser. No. 16/420,796, filed May 23, 2019, now U.S. Pat. No. 10,757,419, issued Aug. 25, 2020, which is a continuation-in-part of International Application No. PCT/US2017/067413, which designated the United States and was filed on Dec. 19, 2017, and which claims the benefit of U.S. Provisional Application No. 62/452,265 filed on Jan. 30, 2017. The entire teachings of the above referenced applications are incorporated herein by reference.

BACKGROUND

Video compression can be considered the process of representing digital video data in a form that uses fewer bits when stored or transmitted. Video encoding can achieve compression by exploiting redundancies in the video data, whether spatial, temporal, or color-space. Video compression processes typically segment the video data into portions, such as groups of frames and groups of pels, to identify areas of redundancy within the video that can be represented with fewer bits than required by the original video data. When these redundancies in the data are exploited, greater compression can be achieved. An encoder can be used to transform the video data into an encoded format, while a decoder can be used to transform encoded video back into a form comparable to the original video data. The implementation of the encoder/decoder is referred to as a codec.

Most modern standardized video encoders (referred to herein as "standard encoders") divide a given video frame into non-overlapping coding units or macroblocks (rectangular regions of contiguous pels, herein referred to more generally as "input blocks" or "data blocks") for encoding. Compression can be achieved when data blocks are predicted and encoded using previously-coded data. The process of encoding data blocks using spatially neighboring samples of previously-coded blocks within the same frame is referred to as intra-prediction. Intra-prediction attempts to exploit spatial redundancies in the data. The encoding of data blocks using similar regions from previously-coded frames, found using a motion estimation process, is referred to as inter-prediction. Inter-prediction attempts to exploit temporal redundancies in the data. The motion estimation process can generate a motion vector that specifies, for example, the location of a matching region in a reference frame relative to a data block that is being encoded.

The encoder may measure the difference between the data to be encoded and the prediction to generate a residual. The residual can provide the difference between a predicted block and the original data block. The predictions, motion vectors (for inter-prediction), residuals, and related data can be combined with other processes such as a spatial transform, a quantizer, an entropy encoder, and a loop filter to create an efficient encoding of the video data. The residual that has been quantized and transformed can be processed and added back to the prediction, assembled into a decoded frame, and stored in a framestore. Details of such encoding techniques for video will be familiar to a person skilled in the art.

H.264 (MPEG-4 Part 10, Advanced Video Coding [AVC]) and H.265 (MPEG-H Part 2, High Efficiency Video Coding [HEVC], hereafter referred to as H.264 and H.265, respectively, are two codec standards for video compression that achieve high quality video representation at relatively low bitrates. The basic coding unit for H.264 is 16×16 macroblocks, while the equivalent coding tree units for H.265 can take sizes from 16×16 up to 64×64 blocks.

Standard encoders typically define three types of frames (or pictures), based on how the data blocks in the frame are encoded. An I-frame (intra-coded picture) is encoded using only data present in the frame itself and thus consists of only intra-predicted blocks. A P-frame (predicted picture) is encoded via forward prediction, using data from previously-decoded I-frames or P-frames, also known as reference frames. P-frames can contain either intra blocks or (forward-)predicted blocks. A B-frame (bi-predicted picture) is encoded via bi-directional prediction, using data from both previous and subsequent frames. B-frames can contain intra, (forward-)predicted, or bi-predicted blocks.

A particular set of frames is termed a Group of Pictures (GOP). The GOP contains only the decoded pels within each reference frame and does not include information as to how the data blocks or frames themselves were originally encoded (I-frame, B-frame, or P-frame). Older video compression standards such as MPEG-2 use one reference frame (in the past) to predict P-frames and two reference frames (one past, one future) to predict B-frames. By contrast, more recent compression standards such as H.264 and H.265 allow the use of multiple reference frames for P-frame and B-frame prediction.

In standard encoders, inter-prediction is based on block-based motion estimation and compensation (BBMEC). The BBMEC process searches for the best match between the target block (the current data block being encoded) and same-sized regions within previously-decoded reference frames. When such a match is found, the encoder may transmit a motion vector, which serves as a pointer to the best match's position in the reference frame. For computational reasons, the BBMEC search process is limited, both temporally in terms of reference frames searched and spatially in terms of neighboring regions searched.

The simplest form of the BBMEC process initializes the motion estimation using a (0, 0) motion vector, meaning that the initial estimate of a target block is the co-located block in the reference frame. More recent motion estimation algorithms such as enhanced predictive zonal search (EPZS) [Tourapis, A.; "Enhanced predictive zonal search for single and multiple frame motion estimation," *Proc. SPIE* 4671, *Visual Communications and Image Processing*, pp. 1069-1078, 2002] consider a set of motion vector candidates for the initial estimate of a target block, based on the motion vectors of neighboring blocks that have already been encoded, as well as the motion vectors of the co-located block (and neighbors) in the previous reference frame. Once the set of initial motion vector candidates have been gathered, fine motion estimation is then performed by searching in a local neighborhood of the initial motion vectors for the region that best matches (i.e., has lowest error in relation to) the target block. The local search may be performed by exhaustive query of the local neighborhood or by any one of several "fast search" methods, such as a diamond or hexagonal search.

For any given target block, the encoder may generate multiple inter-predictions to choose from. The predictions may result from multiple prediction processes. The predictions may also differ based on the subpartitioning of the target block, where different motion vectors are associated with different subpartitions of the target block and the respective motion vectors each point to a subpartition-sized region in a reference frame. The predictions may also differ based on the reference frames to which the motion vectors point. Selection of the best prediction for a given target block is usually accomplished through rate-distortion optimization, where the best prediction is the one that minimizes the rate-distortion metric $D+\lambda R$, where the distortion D measures the error between the target block and the prediction, while the rate R quantifies the cost (in bits) to encode the prediction and $\lambda$ is a scalar weighting factor.

Standard encoders modulate the amount of compression that occurs within a GOP, an individual frame, a row of data blocks within a frame, or an individual data block, by means of a quantization parameter (QP). If the QP value is high, more quantization occurs and fewer bits are used to represent the data, but the visual quality of the encoded output is worse. If the QP value is low, less quantization occurs and more bits are used, but the visual quality of the encoded output is better. This tradeoff between bitrate (number of bits in the output bitstream per second of the input video) and quality is well known to persons skilled in the art.

The rate control algorithm of the encoder sets the QP values for a frame (as the frame QP), a row of data blocks within a frame (as the row QP), or an individual data block (as the block QP). The rate control algorithm allocates a bit budget to each GOP, frame, and row to achieve a target bitrate for the video encoding. Based on how many bits have been used in the encoding relative to the target bitrate and how full a virtual decoder buffer is in a hypothetical reference decoder (HRD), the rate control algorithm may increase or decrease the QP value for a given data block, row, or frame. The type of rate control determines how much the bitrate may vary from frame to frame. Constant bitrate (CBR) rate control allows little or no variation in the target bitrate from frame to frame. Variable bitrate (VBR) rate control still attempts to achieve the target bitrate on average across the entire video but allows the local bitrate for individual frames to exceed the target bitrate by some factor (e.g., 1.5 or 2 times the target bitrate). Constant rate factor (CRF) rate control attempts to maintain the quality of the output bitstream from frame to frame with less concern for the bitrate of the bitstream. However, CRF rate control may be applied with a "max-rate" parameter that governs the maximum bitrate for any given frame, thus achieving rate control similar to VBR for complex videos.

Often, the input parameters of an encoder are specified by some default configurations that generally vary according to capability, complexity, and encoding speed. For example, the open-source x264 encoder for H.264 encoding has a set of ten predefined presets ranging from "ultrafast" (fastest speed, lowest capability) to "placebo" (slowest speed, highest capability) that set the encoding parameters for the encoding. Encoding parameters that can be modified include the GOP length, the number of reference frames for inter-prediction, the maximum number of consecutive B-frames, the usage of B-frames as reference frames, the placement of adaptive B-frames, the motion estimation algorithm, the maximum range for motion estimation, the subpixel motion estimation algorithm (for fine motion estimation), and the allowable partitions for subpartitioning. In addition to the encoding parameters, the target bitrate, which can be thought of as another input parameter, is also specified in many applications as a function of frame size, available network bandwidth, and other considerations.

Using default configurations to set the input parameters for encoding can lead to encoding inefficiencies when the input parameters are not well-matched to the characteristics of the video data. Consider a method where target bitrate is specified based on the frame resolution, for example. In this case, the same target bitrate is applied independently of the content in the video. If the video content has low spatial complexity and low motion, the target bitrate will likely be "too high" and bits will be wasted because acceptable quality could be achieved with fewer bits; if the video content is spatially complex with high motion, the target bitrate will likely be "too low" and the encoding quality will be poor. The solution to this type of "settings mismatch" is to characterize the video data and then perform "smart" encoding with content-adaptive input parameters.

In general, the process of characterizing video data to derive data-adaptive input parameters involves a few essential steps. First, the data needs to be characterized by computing one or more metrics. Second, the metric values need to be converted to decisions about the input parameters. Third, to determine the effectiveness of the process, the modified encodings with data-adaptive input parameters should be compared against "original" encodings with default input parameters.

Different methods and systems have been proposed to adapt input parameters for video encoding based on the video characteristics. In [Carmel, S. et al., "Quality driven video re-encoding," U.S. patent application Ser. No. 14/912, 291, filed Aug. 11, 2014], a metric called block-based coding quality is computed for a given video to be encoded (referred to herein as a source video) and then a decision is made as to how much the target bitrate can be lowered while maintaining an acceptable value of the quality metric. In this case, there is a single metric to compute and a single input parameter to be modified (the target bitrate), and the video to be encoded must be re-encoded in a closed-loop system to obtain the "improved" (lower-bandwidth) encoding. In [Koren, N. et al., "Encoding/transcoding based on subjective video quality preferences," U.S. Patent Application Ser. No. 15/049,051, filed Feb. 20, 2016], video quality (VQ) is measured by an "objective VQ compare module" to determine how closely an encoded video matches a user's "VQ profile" (representing the user's aesthetic video preferences), with the results fed back to allow re-encoding of the video at a lower bandwidth or higher quality. Koren et al. gives no details as to what constitutes the metrics in the "objective VQ compare module" or what input parameters are modified in the re-encoding. It is clear, however, that both of the methods described above are closed-loop systems that require multiple encodings of the same source video to obtain the final encoding with improved settings.

SUMMARY

Embodiments of the present invention take a different improved approach toward characterizing videos for smart encoding, involving considerations of human perception and perceptual quality optimization (PQO) at every step. In the first step, encoded videos are characterized using metrics designed to capture some aspect of perceptual quality by comparing the encoded videos with the original source videos. These metrics may include a perceptual quality metric based on a perceptual unified importance map combining spatial and temporal importance as proposed in [Lee, N. et al., "Perceptual optimization for model-based video encoding," U.S. patent application Ser. No. 14/845,067, filed Sep. 3, 2015]; the gradient magnitude similarity deviation (GMSD) metric [Xue, W. et al., "Gradient magnitude similarity deviation: A highly efficient perceptual image quality index," *IEEE Trans. on Image Processing*, 23(2):684-695, 2013]; the just noticeable difference (JND) metric [Yang, X. et al., "Motion-compensated residue processing in video coding based on just-noticeable-distortion profile," *IEEE Trans. on Circuits, Systems, and Video Technology*, 15(6): 742-752, 2005]; and the structural similarity (SSIM) metric [Wang, Z. et al., "Image quality assessment: From error visibility to structural similarity," *IEEE. Trans. on Image Processing*, 13(4):600-612, 2004].

Second, the metrics are combined into a prediction of perceptual quality based on training data from multiple subjective viewing tests (herein referred to as "subjective tests") conducted on a set of video encodings for a range of videos. The scores from the subjective tests are averaged to obtain mean opinion scores (MOS), a widely-accepted measure of human perceptual quality. The MOS values from the subjective tests, together with the metric measurements, form the training data. The goal then is to form a model, based on the training data, that predicts MOS as a function of metric values. In one embodiment, a linear model is assumed (i.e., the predicted mean opinion score is a linear combination of metric values) and the coefficients of the linear model are derived from a least-squared error fit of the metric values to the MOS training data. In another embodiment, support vector regression for multiple outputs is used to fit the metric data to the MOS training data to derive the model [Xu, S. et al., "Multi-output least-squares support vector regression machines," *Pattern Recognition Letters*, 34(9):1078-1084, 2013]. The combination of metrics to create a model to predict MOS as a measure of human perceptual quality provides an important distinction between embodiments of the present invention and the prior art in content-adaptive encoding cited above, all of which base their adaptations on objective metrics that attempt to approximate MOS, rather than adapting based on predictions of the subjective MOS metric, as in embodiments of the present invention.

Third, the model predicting mean opinion scores is extended to a model relating metric values to encoding decisions. In one embodiment, metric values measured from multiple encodings of a source video are fed into the model to predict MOS values, resulting in predicted rate-quality curves that are then interpolated to find the relationship between bitrate and predicted mean opinion score for the given source video, and this relationship is used to determine the lowest target bitrate that can achieve a desired mean opinion score, thus estimating target bitrate. In another embodiment, metric values for segments of video data are used to estimate the best target bitrate for each segment.

This three-step process allows for the simultaneous optimization of both encoding quality and encoding bandwidth, either lowering bandwidth for low-complexity, low-motion videos or raising bandwidth for high-complexity, high-motion videos, all while seeking to attain a desired MOS. This is in contrast to embodiments of the present invention in [Carmel, S. et al., 2014], for example, which only seeks to determine how much bandwidth can be lowered while maintaining a minimum quality level and provides no recourse for raising bandwidth when needed for complex videos.

The metrics noted above may also be combined to discern certain video characteristics that indicate better encoding performance is likely if certain encoding parameters are changed. In one embodiment, when metrics from the unified importance map indicate that the video data has low motion and low complexity, the number of B-frames in the encoding is increased.

Perceptual importance maps as mentioned above model the response of the human visual system (HVS) to video content, indicating which parts of each video frame are most noticeable to human perception. Importance maps take on values for each data block in a video frame, and the importance map values for any given data block may change from frame to frame throughout the video. Generally, importance maps are defined such that higher values indicate more important data blocks. A perceptual importance map designed to improve encoding may be adapted into a perceptual quality measure by focusing on only those parts of the importance map calculation that are independent of the encoder's rate control.

Example embodiments are directed to computer systems, methods, and program products for iteratively predicting a target bitrate for producing a desired mean opinion score (MOS). The computer systems comprise at least one processor and memory with computer code instructions stored thereon. The memory is operatively coupled to the processor such that, when executed by the processor, the computer code instructions cause the computer system to execute the methods.

Some of the computer methods, systems, and program products iterate through the following (1)-(4) until a predicted MOS value is close to the desired MOS value. (1) The computer methods, systems, and program products generate an initial encoding of a source video and a decoding of the initial encoding. (2) The computer methods, systems, and program products next compute a first metric and a second metric on the initial encoding, the first metric being based on a video-average gradient magnitude similarity deviation (GMSD) and the second metric being based on a log-normalized mean GMSD. (3) The computer methods, systems, and program products apply a previously-derived model that predicts a mean opinion score (MOS) value for the initial encoding as a function of measurements of the computed first metric and second metric. (4) The computer methods, systems, and program products determine a target bitrate to encode and decode the source video based on a relationship between the predicted MOS value and a desired MOS value.

In example embodiments, the computer methods, systems, and program products derive the previously-derived model as follows. The computer methods, systems, and program products conduct subjective tests on a set of video encodings for a range of videos to generate training data. The computer methods, systems, and program products further obtain, from the subjective tests, mean opinion score (MOS) values by averaging scores provided by human subjects for the set of video encodings. The computer methods, systems, and program products compute the measurements of the first metric and second metric on the video encodings of the training data. The computer methods, systems, and program products calculate, based on the obtained MOS values and the computed metric measurements, a linear model that predicts MOS values as a function of metric values, using a pseudoinverse method. The calculated linear model outputs a model coefficient vector having length equal to the number of the computed metric measurements plus one.

In example embodiments, the computer methods, systems, and program products smooth the training data by fitting a line through the mean score values for the initial encoding and using the smoothed mean opinion score values instead of the mean score values for the initial encodings. In some example embodiments, the computer methods, systems, and program products determine the model that predicts MOS values as a function of metric values from a multi-output least-squares support vector regression (MLS-SVR) method instead of as a linear model. In some example embodiments, the model that predicts MOS values as a function of metric values de-emphasizes certain types of training data by first assigning the training data of certain types weights less than 1, and assigning the remaining training data weights of 1. In these example embodiments, the computer methods, systems, and program products then compute a resulting model coefficient vector using a weighted least squares method.

In some example embodiments, where multiple encodings and decodings of the source video are performed at once initially, the computer methods, systems, and program products perform the following. The computer methods, systems, and program products first compute the first and second metrics on multiple decoded data streams. The computer methods, systems, and program products next predict MOS values for the multiple decoded data streams by applying the previously-derived model to measurements of the computed first and second metrics. The computer methods, systems, and program products then collect the predicted MOS values together with output bitrates of the multiple encodings of the source video to form a predicted rate quality curve. The computer methods, systems, and program products perform interpolation or extrapolation on the predicted rate-quality curve to determine the target bitrate that achieves the desired MOS value.

In some example embodiments, the computer methods, systems, and program products apply a performance margin to the determined target bitrate by adding the performance margin to the determined target bitrate, resulting in a more conservative target bitrate. In some of these example embodiments, the computer methods, systems, and program products instead determine the performance margin by reducing the predicted MOS values by an amount, resulting in a more conservative target bitrate. In some example embodiments, the computer methods, systems, and program products apply steps (1)-(4) to segments of the source video rather than the entire source video, resulting in a set of recommended encoding bitrates, one for each video segment.

In some example embodiments, the computer methods, systems, and program products employ temporal subsampling to reduce the computation time to predict target bitrates for long source videos. For each video segment, the computer methods, systems, and program products choose a representative sub-segment on which to perform the target bitrate prediction by first finding the representative sub-segment by determining an appropriately complex portion of the video segment with a relatively high encoding cost. The computer methods, systems, and program products next estimate an encoding cost of a video frame as an average block variance of a difference signal between a current video frame and a previous video frame. The computer methods, systems, and program products further determine an encoding cost of a sub-segment of video frames equal to an average encoding cost of the video frames in the sub-segment. The computer methods, systems, and program products compute an encoding cost threshold by sorting encoding costs of each video frame in the video segment, and using a 50th percentile of the sorted encoding costs. The computer methods, systems, and program products then select the representative sub-segment having an encoding cost closest to the encoding cost threshold.

In some of these example embodiments, the computer methods, systems, and program products modify the temporal subsampling to account for scene changes by the following. When a scene change is detected, the computer methods, systems, and program products compute a modified encoding cost threshold using a $90^{th}$ percentile of the sorted encoding costs of each video frame in the video segment. The computer methods, systems, and program products then select the representative sub-segment having an encoding cost closest to the modified encoding cost threshold.

In some example embodiments, the computer methods, systems, and program products extend target bitrate predictions for the source video at a given frame size to compute bitrate predictions for the source video at different frame sizes. The encoded target bitrate predictions are used in adaptive bitrate (ABR) applications that require multiple encodings of the source video at different frame sizes and bitrates. The computer methods, systems, and program products then derive the encoded bitrate predictions at different frame sizes by scaling up or down the encoded bitrate prediction at the given frame size by a constant scaling factor, the constant scaling factor being derived from empirical subjective test data. In some of these example embodiments, the computer methods, systems, and program products derive the scaling factors to be content-dependent, based on temporal complexity of the source video, by the following. The computer methods, systems, and program products define the temporal complexity of the source video as an average motion vector magnitude of the video encoding. The defining includes adjusting constant scaling factors to be more conservative for more complex content, resulting in higher scaled bitrates, and more aggressive for less complex content, resulting in lower scaled bitrates. In other example embodiments, the computer methods, systems, and program products derive the scaling factors to be content-dependent, based on the quality of the respective video bitstreams at the smaller frame sizes, with quality measured using average P-frame QP value. In such embodiments, a dynamic scaling factor may be computed using encoding at a first frame size and an initial encoding at a second frame size in a dynamic scaling process. According to an embodiment, the dynamic scaling process adjusts the dynamic scaling factor iteratively, until average P-frame QP values of the encoding at the first frame size and the adjusted encoding at the second frame size converge, to determine a final scaling factor. This final scaling factor can, in turn, be used to compute a final bitrate at the second frame size and a final encoding at the second frame size.

In some example embodiments, for source videos consisting of a main part of a video frame and a banded part of the video frame having horizontal bands at the top and bottom of the video frame, the computer methods, systems, and program products perform the following. The computer methods, systems, and program products predict the target bitrates for the main part separately from the banded part using separate models. The computer methods, systems, and program products then compute the target bitrate for the entire source video as a linear combination of the target bitrates for the main part and the banded part.

In some example embodiments, the computer methods, systems, and program products instead compute the first metric and the second metric for the initial encodings of the source video based on a normalized perceptually-weighted PSNR (NPW-PSNR) metric as follows. The computer methods, systems, and program products calculate a perceptual unified importance map that includes both spatial and temporal offsets that represent spatial and temporal importance of each data block of the source video encodings. The computer methods, systems, and program products next combine the source video encodings into a total offset map. To combine the source video encodings, the computer methods, systems, and program products determine (i) the spatial offset determined from a spatial complexity map based on block variance and edge strength and (ii) the temporal offset from a temporal importance map that estimates how important each data block is to the encoding of future data blocks in the source video. The computer methods, systems, and program products further use the total offset map as a weighting to compute perceptually-weighted PW-PSNR for each video frame in the source video to obtain a frame-average PW-PSNR. The computer methods, systems, and program products then average the frame-average PW-PSNR values across video frames to obtain a video-average PW-PSNR. The computer methods, systems, and program products normalize the video average PW-PSNR by a measure of video complexity to obtain a normalized PW-PSNR measurement. The video complexity being computed as a combination of the spatial and temporal complexity of the source video.

Some of the computer methods, systems, and program products are for selecting videos for a training set that models video quality. The computer methods, systems, and program products provide a set of perceptual quality metrics, a desired mean opinion score (MOS), and a bitrate cap defining a maximum encoding bitrate. The computer methods, systems, and program products collect test data for video encodings for a range of videos. The test data is derived from an original set of training videos and comprises MOS values assigned by human subjects to the encodings and output bitrates from the encodings. The computer methods, systems, and program products generate, for each video in the training set, measurements of the perceptual quality metrics of the test data and a resulting estimate of a target encoding bitrate achieving the desired MOS value. The computer methods, systems, and program products then apply a baseline model that relates the generated perceptual quality metric measurements to the MOS values of the test data. The computer methods, systems, and program products next modify the training set by omitting videos having an estimated target encoding bitrate exceeding the bitrate cap. The computer methods, systems, and program products recalculate the baseline model using the modified training set.

Some of the computer methods, systems, and program products are for determining an optimal subset of perceptual quality metrics for constrained bitrate encoding applications as follows. The computer methods, systems, and program products provide a set of perceptual quality metrics and a desired MOS value. The computer methods, systems, and program products also collect subjective test data for encodings derived from a training set of videos. The subjective test data includes MOS values assigned by human subjects to the encodings and output bitrates from the encodings. The computer methods, systems, and program products further analyze the subjective test data to determine, for each video in the training set, a true bitrate that would achieve the desired MOS value. The computer methods, systems, and program products derive, for each subset of perceptual quality metrics and each video in the training set, a model that predicts MOS as a function of a measured subset of perceptual quality metrics. The computer methods, systems, and program products use the derived model for each subset of the perceptual quality metrics and each video in the training set. The derived model estimates a model bitrate for achieving the desired MOS value.

The computer methods, systems, and program products next calculate, for each subset of the perceptual quality metrics and each video in the training set, a bitrate error representing the difference between the model bitrate and the true bitrate. The computer methods, systems, and program products further select an optimal set of the perceptual quality metrics that produces a largest average bitrate savings, while incurring no underestimates where the model bitrate is more than a given percentage lower than the true bitrate for any video in the training set. The selected optimal set produces video quality at the desired MOS and maximizing the average bitrate savings subject to a constraint on the target bitrate error. In example embodiments, the fixed percentage is ten percent. In example embodiments, the bitrate encoding application is an adaptive bitrate application that uses a fixed bitrate encoding ladder, wherein the application encodes all videos at a given frame size at one or two fixed bitrates.

Some of the computer methods, systems, and program products are for determining an optimal number of B-frames for encoding a video. The computer methods, systems, and program products compute a temporal complexity metric for a video. The computer methods, systems, and program products then determine whether the video is temporally simple. If determined, the computer methods, systems, and program products increase the number of B-frames for encoding of the video.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, with emphasis instead placed on illustrating embodiments of the present invention.

DETAILED DESCRIPTION

Figure 1:
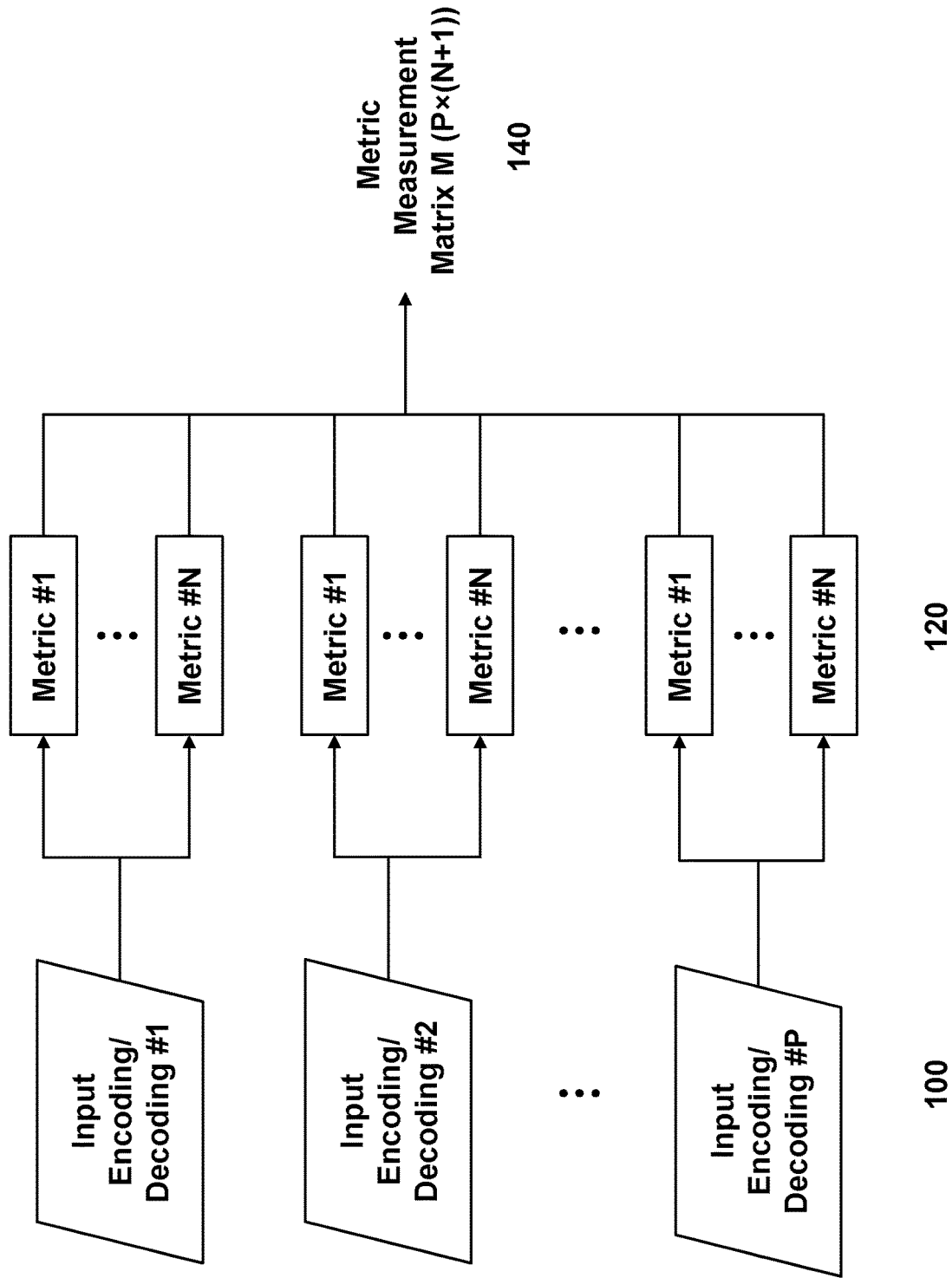
FIG. 1 is a block diagram depicting a method/system of generating of a metric measurement matrix for a set of training videos.

The teachings of all patents, published applications, and references cited herein are incorporated by reference in their entirety. A description of example embodiments of the invention follows.

Embodiments of the present invention are directed to computer methods, systems, and program products. Embodiments described below are performed as a computer-implemented method (or multiple computer-implemented methods). One or more systems may be executed to implement this method (or multiple methods).

The embodiments can be applied to various standard encodings. In the following, unless otherwise noted, the terms "conventional" and "standard" (sometimes used together with "compression," "codecs," "encodings," or "encoders") can refer to MPEG-2, MPEG-4, H.264, HEVC, VP9, VP10, or any other widely used compression codec. "Data blocks" are referred to without loss of generality as the basic coding unit of the encoder and may also sometimes be referred to interchangeably as "input blocks" or "macroblocks." The current data block being encoded is referred to as a "target block."

Perceptual Quality Metric Based on Perceptual Importance Maps

Perceptual importance maps may be constructed to model the response of the human visual system (HVS) to the content in a video, indicating which parts of each video frame are most noticeable to human perception. Importance maps take on values for each data block in a video frame, and the importance map values for any given data block may change from frame to frame throughout the video. Generally, importance maps are defined such that higher values indicate more important data blocks. A perceptual importance map designed to improve encoding may be adapted into a perceptual quality measure by focusing on only those parts of the importance map calculation that are independent of the encoder's rate control.

An importance map may be comprised of both spatial and temporal components, in which case it is termed a unified importance map, effectively balancing both aspects of human visual response (spatial and temporal).

As detailed in [Lee, N. et al., U.S. patent application Ser. No. 14/845,067], the spatial component of a unified importance map may be represented as a spatial complexity map (SCM) that indicates the relative spatial importance of each data block relative to other, neighboring data blocks. The outputs of the SCM may be used to modify the quantization parameter (QP) value on a block-by-block basis using a rule-based approach.

In an example embodiment of the present invention, the method may determine block-by-block spatial QP offsets during look-ahead processing, prior to frame encoding, using only data available independent of encoding. First, edge strength may be calculated on a pixel-by-pixel basis as the sum of horizontal and vertical edge strength. Horizontal edge strength edgeX may be measured by the absolute value of the difference between a pixel and its neighboring pixel to the left: edgeX=abs (curPixel−leftPixel). Vertical edge strength edgeY may be measured by the absolute value of the difference between a pixel and its neighboring pixel on top: edgeY=abs (curPixel−topPixel). Total edge strength edgeTot may be taken to be the sum of the horizontal and vertical edge strengths: edgeTot=edgeX+edgeY, where edgeTot is clipped to 255, the maximum allowable pixel value. The edge strength for an entire data block, edgeDB, may then be calculated as the average edge strength of all the pixels in the data block, which for 16×16 data blocks total 256 pixels: edgeDB=($1/256$)*[$\Sigma_{k=1}^{256}$(edgeTot)$_k$]. The value of edgeDB may be normalized to a round number edgeDBnorm_max (e.g., edgeDBnorm_Max=10) by scaling relative to the maximum value of edgeTot, 255: edgeDBnorm=edgeDBnorm_Max*edgeDB/255.

Data blocks may be characterized by a combination of their block variance $var_{block}$, their edge strength edgeDBnorm, and the edge strengths of surrounding data blocks. Data blocks having low edge strength (edgeDBnorm<1) may be classified as flat blocks (if $var_{block}$<vthresh, for some variance threshold vthresh, e.g., vthresh=400) or clean edges (if $var_{block}$>vthresh). Data blocks having high edge strength (edgeDBnorm>1) may be classified as either complex edges (if surrounding data blocks have edge strengths less than 1) or complex data blocks (if no surrounding data blocks have edge strengths less than 1).

Normalized edge strength edgeDBnorm may then be used to adjust the block variance by multiplying the two quantities together: $var_{block-adj}$=edgeDBnorm*$var_{block}$. Thus, values of edgeDBnorm less than 1 will decrease block variance and values greater than 1 will increase it. Because low values of edge strength may result from either data blocks with clean edges (which will have high variance) or flat blocks (which will already have low variance), the edge strength downward adjustment should only be applied to data blocks with variance greater than vthresh, i.e., for clean edge data blocks.

In a further embodiment, the method may determine spatial QP offset for each data block, $QP_{spatial-offset}$, from the adjusted block variance $var_{block-adj}$ by means of a table lookup. The table may be determined by empirical experimentation by examining encoding quality in several videos for various QP values. The table will vary depending on the encoder and the encoding standard. A sample table for H.264 I-frames is listed below.

TABLE 1 spatial QP offset as function of adjusted block variance, for H.264 encoding

| $var_{block-adj}$ | | $QP_{spatial-offset}$ |
|---|---|---|
| From | To | (I-frames) |
| v1 | v2 | −5 |
| v3 | v4 | −4 |
| v5 | v6 | −3 |
| v7 | v8 | −2 |
| v9 | v10 | −1 |
| v11 | v12 | 0 |
| v13 | v14 | +1 |
| v15 | v16 | +3 |
| v17 | v18 | +5 |
| v19 | v20 | +7 |
| v21 | v22 | +9 |
| v23 | v24 | +11 |
| v25 | and above | +13 |

The frame QP, $QP_{frame}$, may be made to correspond with the "neutral zone" of medium block variance (v11 to v12), where $QP_{spatial-offset}$=0. Thus, data blocks with variance in the neutral zone have their block QP, $QP_{block}$, set equal to $QP_{frame}$. $QP_{frame}$ may be set to a fixed value $QP_0$ for I-frames, with the value slightly higher for P-frames and B-frames, depending on the values of the ipratio and pbratio parameters.

In a further embodiment, the method may further refine spatial QP offset, $QP_{spatial-offset}$, based on additional considerations. For example, if the original block variance $var_{block}$ and adjusted block variance $var_{block-adj}$ are on different sides of the "neutral zone" (i.e., $var_{block}$>v12 but $var_{block-adj}$<v11), then $QP_{spatial-offset}$ may be set to 0. Additionally, if a given block is identified from edge strength analysis as either a clean edge or a complex edge and the calculated $QP_{spatial\text{-}offset}$ is greater than 0, the value of $QP_{spatial\text{-}offset}$ may be divided by 2 to limit the QP increase (quality decrease) for edges.

In a further embodiment, the method may determine the block QP of each data block, $QP_{block}$, from a combination of the spatial offset $QP_{spatial\text{-}offset}$ determined as above during look-ahead processing and a temporal offset $QP_{temporal\text{-}offset}$ also determined during look-ahead processing. First, the initial block QP, $QP_{block\text{-}init}$, for each data block may be set based on the block variance $var_{block}$. If $var_{block}$ is greater than or equal to v7 from Table 1, $QP_{block\text{-}init}$ may be set to the frame QP, $QP_{frame}$. If $var_{block}$ is less than v7, $QP_{block\text{-}init}$ may be set to a "visibility threshold QP" $QP_{VT}$ for I-frames; $QP_{VT}$ will be slightly higher for P-frames and B-frames, depending on the values of the ipratio and pbratio encoding parameters. The value of $QP_{block\text{-}init}$ may then be clipped if it is either greater than the maximum allowable QP, $QP_{max}$, or less than the minimum allowable block QP, $QP_{block\text{-}min}$. Finally, the block QP, $QP_{block}$ may be calculated as the sum of the initial block QP, the spatial offset, and the temporal offset: $QP_{block} = QP_{block\text{-}init} + QP_{spatial\text{-}offset} + QP_{temporal\text{-}offset}$. If $QP_{block}$ is lower than $QP_{min}$, the minimum allowable frame QP, $QP_{block}$ may be clipped to $QP_{min}$.

In a further embodiment, the method may represent temporal component of a unified importance map as a temporal importance map (TIM) that indicates the relative temporal importance of each data block relative to future data blocks later in the video and determines the temporal offset $QP_{temporal\text{-}offset}$ for each data block from the TIM.

The TIM may be designed as a variation of the MBTree algorithm [Garrett-Glaser, J.; "A novel macroblock-tree algorithm for high performance optimization of dependent video coding in H.264/AVC," unpublished, 2007; http://x264.nl/developers/Dark_Shikari/MBtree%20paper.pdf].
The MBTree algorithm determines for each macroblock (data block) a "propagation cost" that estimates how much macroblocks in future frames depend on that macroblock. The propagation cost depends on both an "intra cost" (the estimated cost in bits for intra-prediction of the macroblock) and an "inter cost" (the estimated cost in bits for inter-prediction of the macroblock). The fraction of information propagated from a given macroblock to macroblocks in its reference frames is given by propagate_fraction=1−(intra_cost/inter_cost), and the total amount of information propagated from the given macroblock to its reference frames is given by propagate_amount=(intra_cost+propagate_cost)*propagate_fraction. The value of propagate_cost is initialized to zero. Next, propagate_amount is split among the macroblocks in the reference frames used to predict the current macroblock (for example, two reference frames for bi-prediction), and the properly split propagate_amount values are added to the propagate_cost values for each of the macroblocks used to predict the given macroblock. Finally, propagate_cost is converted to a temporal QP offset: $QP_{temporal\text{-}offset}$=−strength*log 2((intra_cost+propagate_cost)/intra_cost), where strength is an empirically-derived constant.

The TIM algorithm may vary from the MBTree algorithm by replacing the intra cost quantity in the propagation cost calculation with an initial temporal importance TI_init for each macroblock. Thus, propagate_amount=(TI_init+propagate_cost)*propagate_fraction and $QP_{temporal\text{-}offset}$=−strength*log 2((TI_init+propagate_cost)/TI_init). The value of TI_init may be set to 255 for I-frames and P-frames and to 170 for B-frames. The TIM algorithm may also modify the calculation of propagate_fraction so that propagate_fraction=1 when inter_cost<0.2*intra_cost (i.e., inter-prediction will almost certainly be used for the current macroblock). The TIM algorithm may also differ from the MBTree algorithm by capping propagate_cost to a maximum value of 15 times TI_init, which then limits $QP_{temporal\text{-}offset}$ to no lower than −10.

In a further embodiment, the method may adapt a unified importance map with spatial component based on the SCM and temporal component based on the TIM into a perceptual quality metric by focusing on only those parts of the importance map calculation that are independent of the encoder's rate control. For the SCM, this means that the values of $QP_{spatial\text{-}offset}$ for each data block should be obtained solely from Table 1. For the TIM, all quantities are already computed independently of the encoder's rate control. However, because the TIM is not normally computed for B-frames, the TIM quantities need to be computed for an encoding with "IPPP" (no B-frame) GOP structure to ensure that temporal offsets QP temporal-offset are computed for all blocks in all frames. The temporal and spatial offsets may be combined to form total offset map, $QP_{total\text{-}offset} = QP_{spatial\text{-}offset} + QP_{temporal\text{-}offset}$.

The total offset map may be used as a weighting for other quality measures to obtain a perceptual quality measure. In one embodiment, the total offset map is used to weight PSNR on a block-by-block basis to obtain a perceptually-weighted PSNR (PW-PSNR). Given the original (uncorrupted) source video data V and encoded data E, the mean-squared error (MSE) for a given data block k is given by $MSE_k = 1/R \cdot C \Sigma_{i=0}^{R-1} \Sigma_{j=0}^{C-1} [V_k(i,j) - E_k(i,j)]^2$, where i and j index the pixels of data block k, and where R and C are the row and column dimensions of the data block (in H.264 encoding, for example, both R and C equal 16). The peak signal-to-noise ratio (PSNR) for data block k is then given by $PSNR_k = 20 \cdot \log_{10}(p_{max}) - 10 \cdot \log_{10}(MSE_k)$, where $p_{max}$ is the maximum possible pixel value (e.g., 255 for 8-bit processing, though the techniques described herein are not confined to 8-bit processing). The average PSNR over a frame r is then given by $PSNR[r] = 1/L \Sigma_{k=0}^{L-1} PSNR_k = 20 \cdot \log_{10}(p_{max}) - 1/L \Sigma_{k=0}^{L-1} 10 \cdot \log_{10}(MSE_k)$, where k indexes the data blocks in the frame and L is the total number of data blocks in the frame. If the weighting from the total offset map for a given data block k is given by $w_k$, then the perceptually-weighted PSNR for a given block k may be calculated as $PW\text{-}PSNR_k = 20 \cdot \log_{10}(p_{max}) - 10 \cdot \log_{10}(w_k \cdot MSE_k)$, and the frame-average PW-PSNR for a frame r may be calculated as $$PW - PSNR[r] = \frac{1}{L}\sum_{k=0}^{L-1} PW - PSNR_k = 20 \cdot \log_{10}(p_{max}) - \frac{1}{L}\sum_{k=0}^{L-1} 10 \cdot \log_{10}(w_k \cdot MSE_k).$$

In a further embodiment, the method may derive weights $w_k$ for the PW-PSNR metric by first computing raw weights $wr_k$ for each block k and then normalizing. The raw weights $wr_k$ may be calculated from the total offset map. If the total QP offset for a given block k is denoted $qo_k$, then the raw weight for block k is given by $wr_k = (qo_{const} - qo_k)/qo_{const}$, where $qo_{const}$ is a constant. The raw weights $wr_k$ take on values between 0 and 2. The normalized weights $w_k$ are then computed as $w_k = (1/S) \cdot wr_k$, where $$S = \frac{1}{L}\sum_{k=0}^{L-1} wr_k$$

is the sum of all the raw weights in the frame. The normalization ensures that the normalized weights $w_k$ within a frame sum to 1.

In a further embodiment, the method may adjust the normalization of the PW-PSNR weights so that $qo_{const}$ is changed for each frame individually, instead of using the same value for all the frames.

In a further embodiment, once the PW-PSNR metric is calculated for each frame r, the method may calculate the average PW-PSNR across an entire video v by averaging across frames:

$$PW-PSNR\{v\} = \frac{1}{R}\sum_{r=0}^{R-1} PW-PSNR[r],$$

where R is the total number of frames in video v. In another embodiment, the method may calculate video-average PW-PSNR, PW-PSNR{v}, via different methods of aggregating or pooling the frame-average PW-PSNR values, PW-PSNR[r]. For example, PW-PSNR{v} may be calculated as the median of the PW-PSNR[r] values, as some percentile (e.g., the $50^{th}$ or $25^{th}$ percentile) of the ordered PW-PSNR[r] values, or as the minimum of the ordered PW-PSNR[r] values. Pooling strategies that focus on the lower frame-average metric measurements in a video (instead of mean or median metric measurements) can be more accurate when human perception of the video depends more on worst-case video quality rather than average video quality. This might happen, for example, when there is a brief but severe artifact during the video.

In a further embodiment, the method may normalize video-average value of PW-PSNR{v} by a measure of the complexity of the video, so that video-level PW-PSNR values can be meaningfully related across different types of videos. In one embodiment, video complexity may be represented by a measure of spatial complexity. To determine spatial complexity, the video is encoded under all-I-frame encoding and constant QP rate control. Then, the output bitrates are computed for the three encodings and converted to bits per pixel (BPP), and the log(BPP) values are plotted against the log of the qscale parameter, which can be derived from the QP parameter; the resulting curve is usually close to linear and can be well-approximated by a line. Spatial complexity is then calculated as sum of the slope and intercept of this line. In another embodiment, video complexity may be represented by a measure of temporal complexity. To determine temporal complexity, motion compensation is applied across successive frames of the video. The motion-compensated residuals are quantized at several quantization values (e.g., 1, 2, 4, 8, 16, and 32).

The method then may calculate temporal complexity for a given frame as the sum of the sample entropies of the quantized residuals for that frame, and the temporal complexity for the entire video is the sum of the framewise temporal complexities. In an alternative embodiment, the method may measure temporal complexity instead via average motion vector magnitudes in a given frame. In another embodiment, the method may represent video complexity by a combination of spatial complexity and temporal complexity, for example total-complexity=$C_{tot}$=spatial-complexity+$\gamma$·(temporal-complexity), where $\gamma$ is some constant (for example, $\gamma$=0.4). In an alternative embodiment, the method may compute spatial and temporal complexity for a given video as above, but with temporal pooling rather than frame averaging. In another alternative embodiment, the method may compute approximate spatial and temporal complexity as above on a subsampled version of the video, to save computations.

In a further embodiment, the method may use raw values of PW-PSNR{v} for different videos at fixed perceptual qualities (as quantified by mean opinion scores from subjective tests) to identify the relationship between PW-PSNR and total complexity. For example, the method may perform a subjective test with $\delta$ videos and $\varepsilon$ encodings per videos (typical values may be $\delta$=20 videos and $\varepsilon$=3 encodings per video), where the $\varepsilon$ encodings correspond to different performance points (for example, VBR encodings with different target bitrates). For any given video in the subjective test, one may calculate from the $\varepsilon$ encodings for that video both the mean opinion scores (MOS) from the subjective test results as well as the video-average metric values PW-PSNR{v}. From the resulting PW-PSNR vs. MOS curve (with $\varepsilon$ points), one may then interpolate to find the value of PW-PSNR, $\tilde{p}$, that corresponds to a desired MOS value $\tilde{m}$ (for example, $\tilde{m}$=3.5). There will then be $\delta$ estimates (one for each of the videos in the subjective test) of PW-PSNR metric values $\tilde{p}$ that correspond to the desired MOS value $\tilde{m}$. These may be plotted against the total complexity values $C_{tot}$ for the $\delta$ videos, to show how the PW-PSNR metric varies with $C_{tot}$ when the perceptual quality of the video is held constant at the desired MOS value $\tilde{m}$. Empirical analysis shows that the relationship between PW-PSNR metric values and total complexity values is roughly linear. Without loss of generality, let the equation of this line be $\tilde{p}=\mu\cdot(\beta-C_{tot})$, and $\mu$ and $\beta$ are constants that may be estimated from the $\tilde{p}$ and $C_{tot}$ data. Then the normalized PW-PSNR values $\tilde{np}$ may be calculated as $\tilde{np}=\tilde{p}/\kappa$, where the normalization constant $\kappa=(\beta-C_{tot})/\eta$ and $\eta$ is an arbitrary constant. When computed in this way, normalized PW-PSNR, denoted NPW-PSNR, is independent of the video complexity.

In an alternative embodiment, the method may perform normalization of PW-PSNR slightly differently given more data points from the subjective tests. As described above, for any given video in the subjective test, one may calculate from the $\varepsilon$ encodings for that video both the mean opinion scores (MOS) from the subjective test results as well as the video-average metric values PW-PSNR{v}. From the resulting PW-PSNR vs. MOS curve (with $\varepsilon$ points), one may then interpolate to find three values of PW-PSNR, $\tilde{p}_1$, $\tilde{p}_2$, and $\tilde{p}_3$ that correspond to three desired MOS values $\tilde{m}_1$, $\tilde{m}_2$, and $\tilde{m}_3$ (for example, $\tilde{m}_1$=3.0, $\tilde{m}_2$=3.5, and $\tilde{m}_3$=3.75). For each of the three desired MOS values, there will again be $\delta$ estimates of corresponding PW-PSNR metric values $\tilde{p}$ that may be plotted against the total complexity values $C_{tot}$ for the $\delta$ videos. Empirical analysis shows that the relationship between PW-PSNR metric values and total complexity values may be linear for all three of the desired MOS values, and that the slopes of the three lines are approximately the same. Without loss of generality, let the equation of the three lines be $\tilde{p}=-\mu\cdot C_{tot}+b$, where $-\mu$ is the common slope and b is an offset that varies with the desired MOS value. Then normalized PW-PSNR values $\tilde{np}$ may be calculated as $\tilde{np}=\tilde{p}+\mu\cdot C_{tot}$. One may then calculate the normalized PW-PSNR (NPW-PSNR) values corresponding to the three desired MOS values and determine the equation of the resulting line to determine a linear prediction of MOS from NPW-PSNR. In the applications described below, NPW-PSNR is the preferred form of the PW-PSNR metric.

Signal-Adaptive Bitrate Estimation Using Perceptual Quality Metrics

Perceptual quality metrics such as NPW-PSNR may be used by embodiments to determine input parameters such as target bitrate that are adapted to the video content. Other perceptual quality metrics may be used for this purpose as well, either in addition to or instead of NPW-PSNR. In some embodiments, these may include the gradient magnitude similarity deviation (GMSD) metric [Xue, W. et al, 2013], the just noticeable difference (JND) metric [Yang, X. et al., 2005], or the structural similarity (SSIM) metric [Wang, Z. et al., 2004]. In other embodiments, combinations of metrics may be used by weighting one metric with another, e.g., GMSD weighted by a JND-based map (denoted GMSD-JND) or GMSD weighted by the total offset map in NPW-PSNR (denoted GMSD-NPW). As with NPW-PSNR processing described above, frame-average metric values for a given frame r may be computed as GMSD[r], JND [r], SSIM[r], GMSD-JND[r], GMSD-NPW[r], etc., and video-average metric values GMSD{v}, JND{v}, SSIM{v}, GMSD-JND{v}, GMSD-PW{v}, etc. for a given video v may be computed by averaging across frames.

In another embodiment, the method may combine multiple statistics based on GMSD to obtain an overall perceptual quality metric. As noted in [Xue, W. et al. 2013], the GMSD metric is defined in terms of gradient magnitude similarity (GMS). The GMS map at a given pixel location k is given by $GMS(k)=[2m_u(k) \cdot m_d(k)+c]/[m_u^2(k)+m_d^2(k)+c]$, where $m_u(k)$ is the gradient magnitude of the uncompressed (original) frame at location k, $m_d(k)$ is the gradient magnitude of the distorted (compressed) frame at location k, and c is a scalar constant. The gradient magnitude is defined as $m_u(k)=\sqrt{[u(k) \otimes h_x]^2+[u(k) \otimes h_y]^2}$, where u(k) is the pixel value of the uncompressed frame at location k, $h_x$ and $h_y$ are 3×3 horizontal and vertical temporal gradient filters, respectively, and $\otimes$ is the convolution operator; the gradient magnitude $m_d(k)$ is defined similarly. The gradient magnitude similarity deviation (GMSD) metric for a given frame r is then given by $GMSD[r]=\sqrt{(1/N)\Sigma_{k=1}^{N}[GMS(k)-GMSM]^2}$, where the gradient magnitude similarity mean $GMSM=(1/N)\Sigma_{k=0}^{N-1}GMS(k)$ and N is the total number of pixels in the frame. In one embodiment, the perceptual quality metric may be the GMSD calculated with constant c=500 in the expression for GMS above, denoted as $GMSD_{500}[r]$ for each frame r, with the video-average metric $GMSD_{500}\{v\}$ obtained by averaging $GMSD_{500}[r]$ across frames, i.e., $GMSD_{500}\{v\}=(1/R)\Sigma_{r=0}^{R-1}GMSD_{500}[r]$, where R is the total number of frames. In another embodiment, the perceptual quality metric may be based on the log-normalized mean GMSD with c=500, i.e., $LNMG_{500}\{v\}=\log(GMSD_{500}\{v\}/M_u\{v\})$, where the video-average uncompressed gradient magnitude $M_u\{v\}$ is given by $M_u\{v\}=(1/R)\Sigma_{r=0}^{R-1}m_u[r]$, the frame-average uncompressed gradient magnitude is given by $m_u[r]=\Sigma_{k=0}^{N-1}m_u(k)$, and the gradient magnitude $m_u(k)$ at pixel location k is defined as above. In a further embodiment, the values of $m_u(k)$ may be clamped below to a small positive value (e.g., 0.001) to avoid division by 0 in the expression for $LNMG_{500}\{v\}$. In another, preferred embodiment, the overall perceptual quality metric may be based on both $GMSD_{500}\{v\}$ and $LNMG_{500}\{v\}$.

In another set of embodiments, the method may normalize GMSD-based statistics by quantities derived from the unified importance map described above, so that the normalized GMSD values for different video content having similar subjective quality are approximately the same. In one embodiment, spatial normalization may be applied on a block-by-block basis using block variance $var_{block}$: $SNGMSD[b]=GMSD_b/var_b$, where $GMSD_b$ is the GMSD value for (standard deviation of GMS values for the pixels in) block b and $var_b$ is the block variance of (variance of the pixels in) block b. In a further embodiment, block variance may be clamped to a maximum value (e.g., 1000) so that the block GMSD values are not over-normalized. In another embodiment, temporal normalization may be applied on a block-by-block basis using a multiplier based on the absolute value of the QP offset from the MBTree algorithm.

In a further embodiment, the method may clip the MBTree QP offset to a maximum offset of 3 and then scaled to values between 0.2 and 1. If this clipped and scaled version of the MBTree offset for a given block b is given by mbt[b], then the temporally-normalized GMSD for block b is given by $TNGMSD[b]=mbt[b] \cdot GMSD_b$. In a further embodiment, the temporal and spatial normalizations described above may be combined to obtain an overall normalized GMSD: $NGMSD[b]=(mbt[b]/var_b) \cdot GMSD_b$. Analogous to other metrics described above, the frame-average normalized GMSD for a given frame r may be obtained by averaging over all the blocks in the frame: $NGMSD[r]=\Sigma_{b=0}^{NB-1}NGMSD[b]$, where NB is the total number of blocks in the frame. And the video-average normalized GMSD for a given video v may be obtained by averaging the frame-averaged normalized GMSD values over all the frames in the video: $NGMSD\{v\}=\Sigma_{r=0}^{R-1}NGMSD[r]$, where R is the total number of frames in the video.

In an embodiment, the method may calculate GMSD-based metrics as described above on spatially-subsampled versions of the uncompressed and compressed videos frames, to save computation time.

In an embodiment, the method may generate perceptual quality measurements for a set of training data and combined with subjective test scores for those videos to obtain a model of the relationship between metric values and human perception as quantified by subjective test mean opinion scores (MOS). Similar techniques have been proposed in, for example, [Li, Z. et al., "Toward a practical perceptual video quality metric," 2016, http://techblog.netflix.com/2016/06/toward-practical-perceptual-video.html], but with different metrics and different implementation details.

In the example embodiment of FIG. 1, the method generates a metrics for input encoding. In FIG. 1, let the total number of encodings for the training data be P. If each video in the training set is encoded and then decoded (100 in FIG. 1) at three performance points (for example, three target bitrates for VBR/CBR rate control or three CRF values for CRF rate control), then P=3×Nvideos×Ntest, where Nvideos is the number of videos in the training set and Ntest is the number of subjective tests represented in the training data. MOS values ranging from 1 to 5 (5 being the best and 1 being the worst) may be gathered for each of the P encodings/decodings in the training data into a P×1 vector q. Let the number of metrics calculated for each encoding/decoding (120 in FIG. 1) be N. Metric values for the P encodings/decodings may be gathered into metric measurement vectors $m_1, m_2, \ldots, m_N$, each P×1, and the metric measurement vectors may be combined into a P×(N+1) metric measurement matrix $M=[m_1|m_2| \ldots |m_N|1]$ (140 in FIG. 1) that has as its first N columns the metric measurement vectors $m_1, m_2, \ldots, m_N$ and a 1 vector (vector of all 1s) as its last column.

Figure 2:
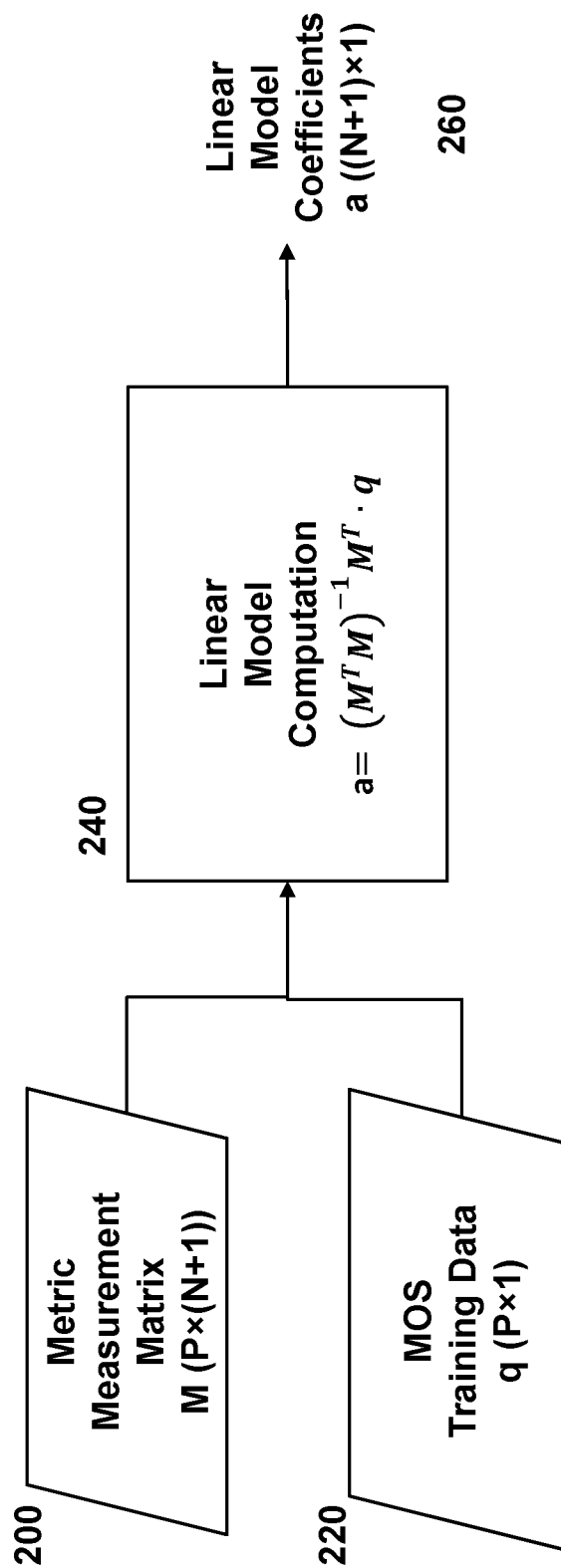
FIG. 2 is a block diagram illustrating a method/system for computing from metric training data and subjective test data, a linear model for predicting mean opinion scores (MOS).

Then, in one embodiment, the method may represent a linear model capturing the relationship between metric values and subjective test MOS values as: $q=a_1m_1+a_2m_2+ \ldots +a_N m_N+a_{N+1}$, where the coefficients $a_1, a_2, \ldots, a_{N+1}$ are constant scalars. The linear modeling equation can be represented in matrix form as q=Ma, where $a=[a_1 a_2 \ldots a_{N+1}]^T$ is the (N+1)×1 column vector of model coefficients. The well-known solution to this equation is $a=M^+\cdot q$, where $M^+=(M^T\cdot M)^{-1}\cdot M^T$ is the (N+1)×P pseudo-inverse of M. The linear model computation process is illustrated in the method/system of FIG. 2, with inputs being the metric measurement matrix M (200 in FIG. 2) and the MOS training data q (220 in FIG. 2), the linear model computation using the pseudoinverse 240, and the output being the model coefficient vector a (260 in FIG. 2).

In other embodiments, the method may determine the model coefficient vector a from the measurement matrix M and the MOS training data q using multi-output least-squares support vector regression (MLS-SVR) [Xu, S. et al., 2013], convolutional neural networks [Le Callet, P. et al., "A convolutional neural network approach for objective video quality assessment," *IEEE Trans. on Neural Networks*, 17(5):1316-1327, 2006], orthogonal matching pursuit [Pati, Y. et al., "Orthogonal matching pursuit: Recursive function approximation with applications to wavelet decomposition," in *Proc. of the 27th Asilomar Conference*, 40-44, 1993], or other machine learning or statistical modeling methods.

In a further embodiment, the method may further relate predicted MOS values to input parameters such as target bitrate by interpolating or extrapolating rate-quality data from encodings of new videos not in the training set. For example, a given video v encoded at three different target bitrates will generate three rate-quality points, depicting predicted MOS (predicted using the modeling method as detailed above) versus the encoded bitrates (the actual bitrates after encoding). The three points may then be interpolated to form a rate-quality curve. In one embodiment, the interpolation is carried out using piecewise spline interpolation. In other embodiments, the interpolation may be carried out using piecewise linear or polynomial interpolation. In another embodiment, the rate-quality curve is modified to plot MOS versus the log of the encoded bitrate (or bits per pixel), prior to the interpolation step. In another embodiment, the rate-quality curve may be extrapolated as needed to determine the bitrate that achieves a MOS value not within the range represented by the training data.

Figure 3:
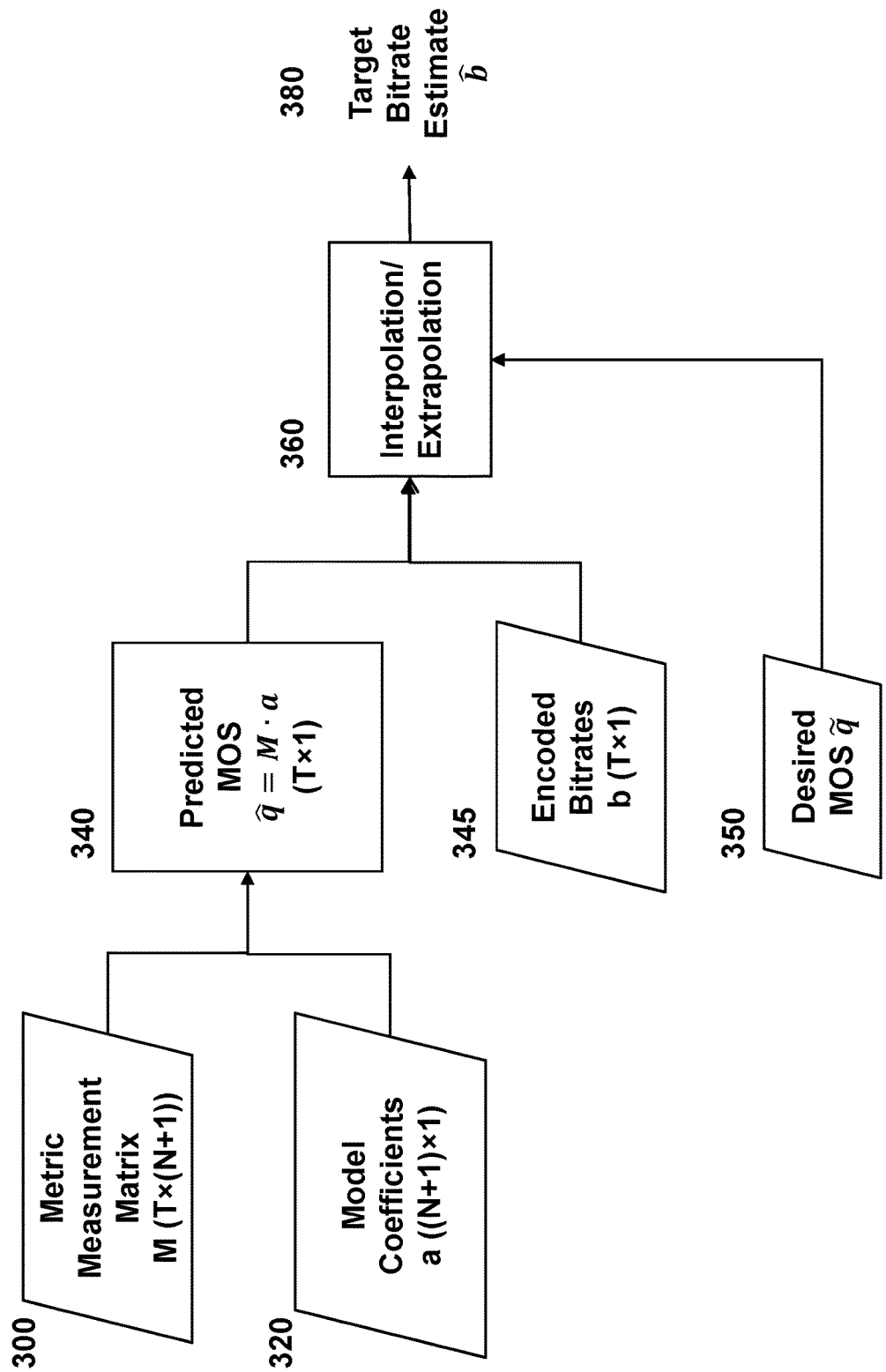
FIG. 3 is a block diagram showing a method/system for applying a perceptual model to predict MOS for a given video and then estimating the target bitrate to achieve a target MOS for that video.

In the embodiment of FIG. 3, the method uses a derived perceptual model, as represented by the model coefficient vector a, to estimate the target bitrate that will achieve a desired MOS value $\tilde{q}$ (for example, $\tilde{q}$=3.5) for a new video not in the training set. Assuming VBR or CBR rate control, the new video is encoded at T target bitrates (for example, T=3) and the set of N metrics is computed on each of the T encodings to obtain the T×(N+1) metric measurement matrix M (300 in FIG. 3). The matrix M is then multiplied by the (N+1)×1 model coefficient vector a (320 in FIG. 3) to obtain a T×1 vector $\hat{q}$ of predicted MOS values (340 in FIG. 3). The predicted MOS values $\hat{q}$ and the encoded bitrates b from the T encodings (345 in FIG. 3) then form a (predicted) rate-quality curve. As detailed above, one can then perform interpolation or extrapolation on the rate-quality curve (360 in FIG. 3) to estimate the bitrate $\hat{b}$ (380 in FIG. 3) that achieves a desired MOS value $\tilde{q}$ (350 in FIG. 3).

Figure 4:
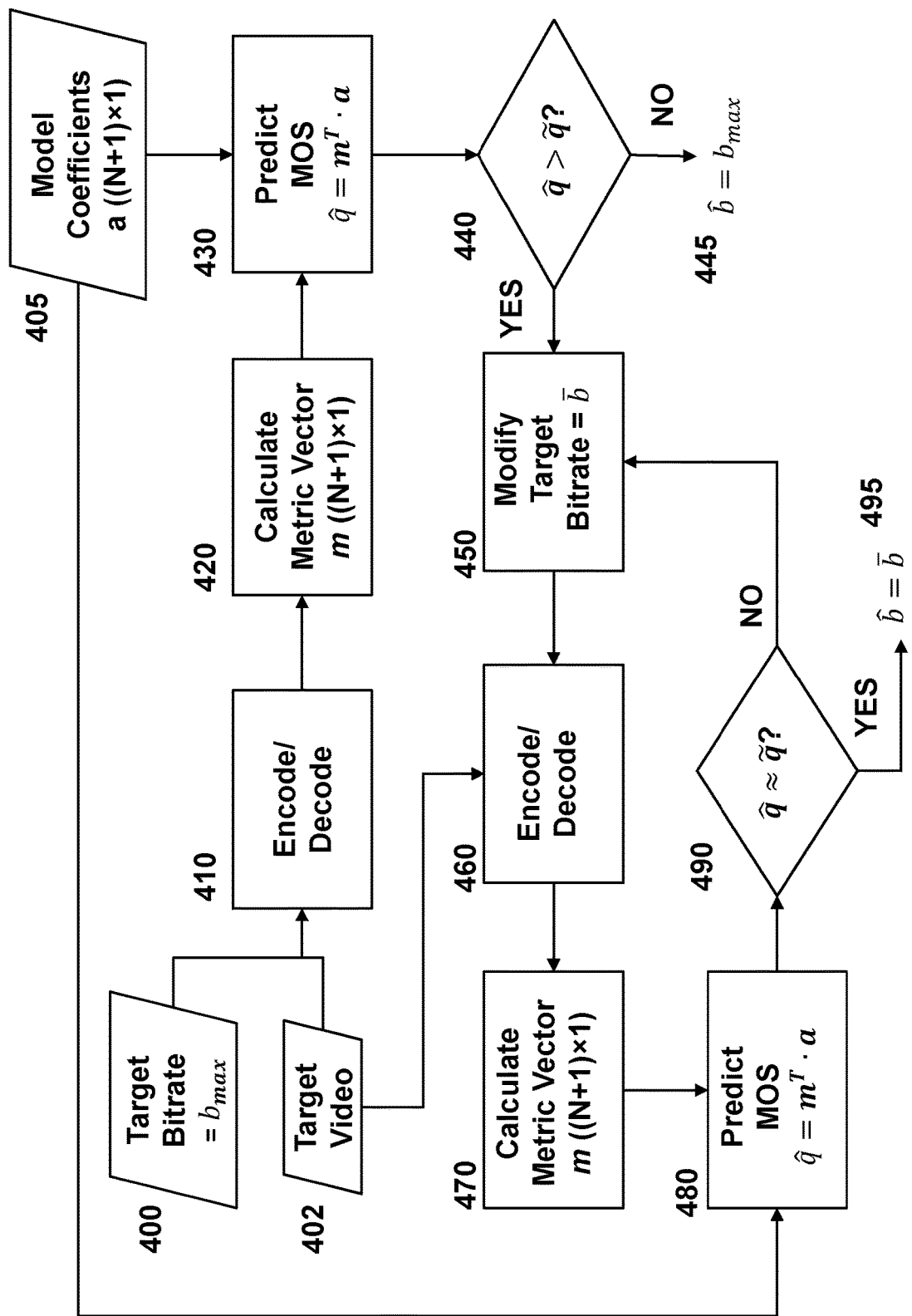
FIG. 4 is a block diagram detailing a method/system of iteratively applying a perceptual model to the target bitrate to achieve a target MOS for a given source video.

In the embodiment of FIG. 4, the method uses a derived perceptual model to estimate, via an iterative process, the target bitrate that will achieve a desired MOS value $\tilde{q}$ for a source video to be encoded. In this alternative method, the target bitrate is initially set to a maximally allowable bitrate $b_{max}$ (400 in FIG. 4) and the source video (402 in FIG. 4) is encoded/decoded (410 in FIG. 4) and its (N+1)×1 metric vector m is computed (420 in FIG. 4). The metric vector m is then multiplied by the (N+1)×1 model coefficient vector a (405 in FIG. 4) to obtain a predicted MOS $\hat{q}$ (430 in FIG. 4) for the initial encoding. The value of $\hat{q}$ is then compared (440 in FIG. 4) to the target MOS $\tilde{q}$. If $\hat{q}<\tilde{q}$, no bitrate savings is possible without exceeding the maximum allowable bitrate, so the estimated target bitrate $\hat{b}$ is set to $b_{max}$ (445 in FIG. 4). If $\hat{q}>\tilde{q}$, the target bitrate can be lowered while still maintaining the desired MOS, so the target bitrate is modified (450 in FIG. 4) to a lower value $\bar{b}$, for example by halving the previous target bitrate. The source video (402 in FIG. 4) is then encoded/decoded (460 in FIG. 4) at the lower target bitrate $\bar{b}$, another metric vector m is computed (470 in FIG. 4), and the predicted MOS $\hat{q}$ is then recalculated (480 in FIG. 4) by multiplying the model coefficient vector a (405 in FIG. 4) by the new metric vector m (470 in FIG. 4). The new predicted MOS $\hat{q}$ is then compared (490 in FIG. 4) with the target MOS $\tilde{q}$. If $\hat{q}\approx\tilde{q}$ (for example, within 0.1), then the process ends and the estimated target bitrate $\hat{b}$ is set to $\bar{b}$ (495 in FIG. 4). If the two MOS values are not close, then the process iterates with a further modification of $\bar{b}$ in 450 of FIG. 4. In the latter case, the candidate target bitrate $\bar{b}$ should be modified in the same direction as the desired MOS change (i.e., raise $\bar{b}$ if $\hat{q}$ needs to be higher and lower $\bar{b}$ if $\hat{q}$ needs to be lower).

In an alternative embodiment of FIG. 4, the method gathers subjective test data for a set of videos to determine an average slope $\bar{s}$ of the rate-quality curves for the videos, the slope relating the change in MOS relative to the change in the log of bitrate (or, equivalently, the change in bits per pixel), e.g., $\bar{s}=\Delta q/\Delta\log (b)$; the slope $\bar{s}$ may then be used to guide the iterative search process in the method/system of FIG. 4. For example, the first time $\hat{b}$ is calculated in 450 of FIG. 4, it may be calculated as $\log (\hat{b})=\log (b_{max})+[(\tilde{q}-\hat{q})/\bar{s}]$. Using an empirically-derived slope in this way can cause the iterative search process to converge more quickly than the "standard" iterative process described above, where the first two bitrate estimates are the maximum bitrate and half the maximum bitrate.

In another embodiment, elements from FIG. 3 and FIG. 4 may be combined, where the target bitrate is estimated and modified as in the method/system of FIG. 4, but multiple encodings are done at each step as in the method/system of FIG. 3, with interpolation/extrapolation used to estimate the target bitrate $\bar{b}$ as appropriate.

In an alternative embodiment, the method/system of FIG. 4 may be modified accordingly for models that predict multiple outputs, such as MLS-SVR [Xu, S. et al., 2013].

In an embodiment, the method may revise signal-adaptive bitrate estimation (SABRE) scheme detailed above (as described in FIGS. 3 and 4) to generate more conservative bitrate estimates $\hat{b}$ to avoid situations where the encoded bitrate is too low, such that the subjective quality of the resulting encoded bitstream falls below the target MOS $\tilde{q}$. In one embodiment, the bitrate estimates $\hat{b}$ from the SABRE process (380 in FIG. 3 or 495 in FIG. 4) are increased by some amount (e.g., 500 kbits/s) to provide a performance margin. In another embodiment, the performance margin is provided by reducing the predicted MOS values $\hat{q}$ (340 in FIG. 3 or 430 in FIG. 4) by some amount (e.g., 0.3), causing the estimated target bitrate $\hat{b}$ (380 in FIG. 3 or 495 in FIG. 4) to increase as a result.

In a further embodiment, the method may apply the SABRE scheme detailed above to segments of a long video, resulting in a set of recommended target bitrates, one for each segment. In one embodiment, the video segment length for SABRE computations is chosen to be 6 seconds. In another embodiment, the segment length is chosen to be an integer multiple of the segment length selected for adaptive bitrate (ABR) streaming protocols such as HLS or MPEG-DASH. In another embodiment, the segment lengths may vary depending on the length of scenes detected by various scene cut detection algorithms.

In an embodiment, the method may employ temporal subsampling to reduce SABRE computation times for long videos. This may be done by choosing, for each segment of a long video, a representative sub-segment of contiguous frames on which to perform the SABRE calculation. The representative sub-segment may be found by determining an appropriately complex portion of the video segment with a relatively high encoding cost. In one embodiment, the encoding cost of a video frame is estimated as the average block variance of the difference signal between that frame and the previous frame. Then, the frames $t_1, t_2, \ldots, t_n$ in a video segment of length n will have a set of associated estimated encoding costs $E_{t_1}, E_{t_2}, \ldots, E_{t_n}$. The set of estimated encoding costs may then be sorted and a desired encoding cost $E_\tau$ may be derived from the order statistics of the estimated encoding costs. In one embodiment, $E_\tau$ is chosen as the $90^{th}$ percentile of the sorted estimated encoding costs. In other embodiments, $E_\tau$ may be chosen as the mean, median, or other percentiles of the sorted estimated encoding costs. Once the desired encoding cost $E_\tau$ is found for a given video segment, a sub-segment of length m (m<n) is chosen by determining the sub-segment whose average or median estimated encoding cost (calculated over all frames in the sub-segment) is closest to $E_\tau$. By performing SABRE calculations over a shorter, representative sub-segment of each video segment in a long video, significant computational savings may be realized. In one embodiment, the sub-segment length n is chosen to be 2 seconds for a segment length m of 6 seconds.

In a further embodiment, the method may modify the temporal subsampling technique to account for scene changes. In one embodiment, scene changes may be detected using frame differencing. For a set of frames $t_1, t_2, \ldots, t_n$ in a video segment of length n, define the frame difference $D[t_r] = (1/NP) \Sigma_{k=1}^{NP} |L_{t_{r-1}}[k]|$, where NP is the number of pixels in the frames and $L_{t_r}[k]$ is the luminance value of pixel k in frame $t_r$. The difference values $D[t_1], \ldots, D[t_n]$ may then be sorted and the median difference calculated as $D_{median}$. A scene change is then declared if the absolute value of the difference between any of the individual frame differences and the median frame difference exceeds a threshold, i.e., $\max_r |D[t_r] - D_{median}| > D_\tau$. In an embodiment, the difference threshold $D_\tau$ is set to 60. Once a scene change is detected, the temporal subsampling technique may be modified accordingly. In one embodiment, the desired encoding cost $E_\tau$ as defined above is typically chosen as the mean of the encoding costs $E_{t_1}, E_{t_2}, \ldots, E_{t_n}$ in a segment of length n, but when a scene change is detected, the desired encoding cost $E_\tau$ is modified to the $90^{th}$ percentile of the encoding costs $E_{t_1}, E_{t_2}, \ldots, E_{t_n}$. This causes a more conservative SABRE calculation in the presence of a scene change.

In a further embodiment, the method may extend the SABRE scheme detailed above to adaptive bitrate (ABR) applications that generate multiple encodings of the same video at different frame sizes and bitrates and that determine which encoding to transmit based on network conditions. In an embodiment, the method may scale a bitrate estimate for one frame size up or down to obtain a bitrate estimate for a different frame size, so that the SABRE process does not have to be repeated for the second frame size, saving computations. In one embodiment, the scaling factor is determined from the ratio of pixels in the two frame sizes. In another embodiment, the scaling factor is modified using empirical subjective test data to enable more conservative (i.e., higher) bitrate estimates for the second frame size. In another embodiment, different scaling factors may be derived for different content, with content categorized, for example, using spatial or temporal complexity as defined above. For example, constant scaling factors may be adjusted to be more conservative (resulting in higher scaled bitrates) for more complex content and more aggressive (resulting in lower scaled bitrates) for less complex content.

In another embodiment, the method may use a fully dynamic scaling process to determine the proper scaling factor for each frame size relative to the full resolution frame size. As detailed in FIG. 5, the dynamic scaling process may be initialized by first applying a bitrate estimation process (510), such as the SABRE process detailed above, for a given target video (500), a desired MOS value q̃ (501), and a first frame size (502), to obtain a bitrate estimate b̂ at the first frame size (512) and a corresponding encoding (514) for the first frame size at the bitrate b̂. An initial bitrate estimate at a second frame size (503) may then be determined by computing a fixed scaling factor, as detailed above, dependent on the first frame size (502) and second frame size (503) and then applying the fixed scaling factor to the bitrate estimate b̂ to obtain the encoding bitrate b' at the second frame size. An initial encoding of the video at the second frame size may then be computed (520) at the encoding bitrate b'. The encoding at the first frame size (514) and the initial encoding at the second frame size (520) become the inputs to a dynamic scaling process (530). The quality of the bitstream at the second frame size (520) may be compared to the quality of the bitstream at the first frame size (514) by computing the average QP value of P frames in the respective bitstreams (the bitstream at the first frame size and the bitstream at the second frame size).

To continue, in such an embodiment, the scaling factor may be adjusted iteratively based on the ratio of the respective average P-frame QP values, with the process terminating when the values converge, resulting in a final encoding at the second frame size (540) based on the adjusted scaling factor. In another embodiment, the dynamic scaling process may be further adjusted based on the complexity of the full resolution bitstream. In a further embodiment, the dynamic scaling process may be optimized computationally by considering sub-segments of each video segment, similar to the temporal subsampling process described above. In an alternative embodiment, the dynamic scaling process may employ a measure of video encoding quality based on the average QP value over all frames, not just P frames as described above.

Figure 5:
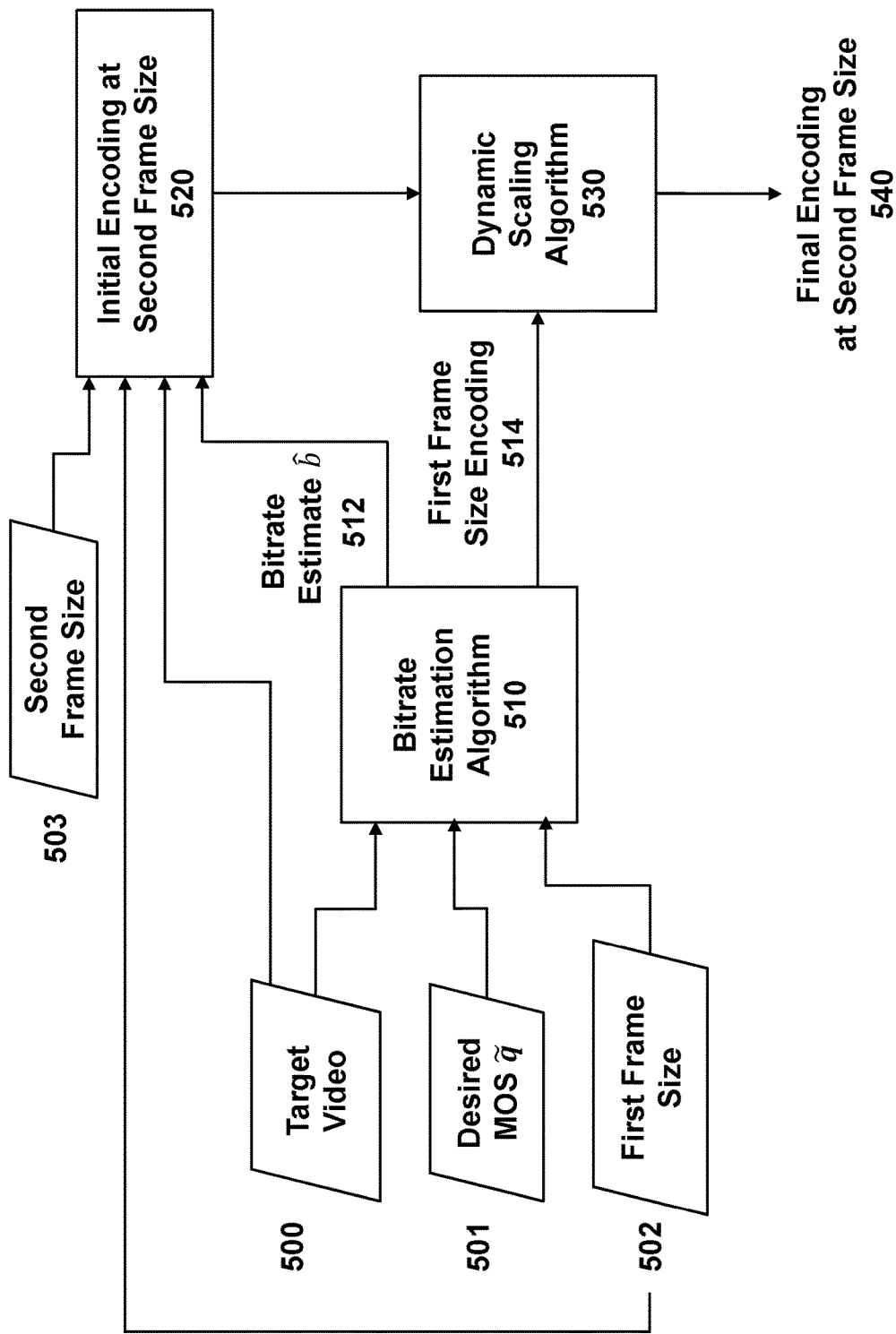
FIG. 5 is a block diagram detailing a method/system of applying a dynamic scaling algorithm to determine encoding bitrates at different frame sizes in adaptive bitrate (ABR) applications.

The dynamic scaling process depicted in FIG. 5 may be used with other embodiments described herein. For example, the process in FIG. 5 (or components thereof) may be implemented with the processes depicted in FIGS. 3 and/or 4 (or components thereof) to estimate bitrates in ABR applications to generate multiple encodings of the same video at different frame sizes and different bitrates and to determine which encoding to transmit based on network conditions.

In a further embodiment, the method may employ similar scaling considerations as those detailed above for ABR applications when performing SABRE calculations for portions of a video frame, such as for letterboxed videos, in which black horizontal bands occupy the top and bottom of the frame and the main video "content" is in the middle of the frame (termed here the "main part" of the frame). In one embodiment, the method may compute a SABRE bitrate estimate for the main part of the frame and then scaled up by the ratio of the number of pixels in the entire frame to the number of pixels in the main part of the frame. In an alternative embodiment, the method may model black bands separately to determine a SABRE bitrate estimate for the banded (secondary) part of the frame and then linearly combined with the SABRE bitrate estimate for the main part of the frame to obtain an overall SABRE bitrate estimate for the whole frame: $\hat{b} = a \cdot \hat{b}_{main} + (1-a) \cdot \hat{b}_{banded}$, where a is the ratio of the number of pixels in the main part of the frame to the number of pixels in the entire frame. In an alternative embodiment, the above techniques may also be applied for cropped videos, where the main part of the frame is what remains after cropping and the secondary part of the frame is the part that is cropped off.

Selection of Perceptual Quality Metrics for Signal Adaptive Bitrate Estimation

Content-adaptive encoding schemes, such as the signal adaptive bitrate estimation (SABRE) scheme detailed above, are typically evaluated for adaptive bitrate (ABR) applications by determining their bitrate savings relative to a fixed-bitrate ABR encoding ladder. In a typical ABR encoding ladder, videos are encoded at multiple frame sizes and the ladder specifies one or two encoding bitrates for each frame size. Under the ABR encoding ladder, all videos at a given frame size are encoded at the same one or two bitrates specified by the ladder. By adapting to the content in the video, content-adaptive encoding schemes may save bitrate relative to the fixed-bitrate ABR encoding ladder by encoding simpler videos at lower bitrates while maintaining acceptable video quality. The key question for any content-adaptive encoding scheme is how video quality is measured.

In the SABRE scheme detailed above, the method may use subjective test data to select the perceptual quality metrics used to measure video quality. For a given source video in a subjective test, subjective test scores may be collected and averaged to form mean opinion scores (MOS) for multiple encoding bitrates, and the resulting collection of MOS vs. bitrate data points may be interpolated to form a rate-quality curve. From the rate-quality curve, one may then determine the "true" bitrate (with "truth" being measured by the interpolated subjective test data) that would achieve the SABRE target MOS value for that source video. The true bitrate may then be compared against the "model" bitrate estimated by running SABRE with a given model based on a given set of perceptual quality metrics. The difference between the true bitrate and the model bitrate is defined as the bitrate error.

Bitrate error may be incorporated into the selection of perceptual quality metrics for the SABRE methodology, with emphasis toward minimizing underestimates where the model bitrate is less than the true bitrate. Underestimates will cause the quality of the SABRE encoding to fall below the target MOS value. In one embodiment, perceptual quality metrics for the SABRE methodology are selected to maximize bitrate savings relative to a fixed bitrate ABR encoding ladder, while ensuring there are no underestimates of greater than ten percent. This criterion for evaluating perceptual quality metrics distinguishes the SABRE methodology from other methods of content-adaptive encoding in the prior art, which typically select metrics that accurately predict subjective test MOS (see, for example, [Li, Z., 2016] cited above), without consideration for bitrate error.

Advanced Modeling Techniques for Signal Adaptive Bitrate Estimation

Advanced techniques may be used to improve the modeling in the SABRE scheme detailed above. The modeling process described above is applied to a set of training videos, where metrics are measured for each video in the training set and the aggregate set of metric measurements (across all the videos in the training set) are used to predict the aggregate set of corresponding mean opinion scores (MOS).

As a preprocessing step for modeling, the method may smooth noisy MOS data (from a subjective test) for any given video by fitting a line through the MOS data. In one embodiment, the smoothed MOS values may be calculated as $MOS_{smoothed} = m*\log(bpp) + b$, where bpp stands for bits per pixel (a scaled version of bitrate) and m and b are the slope and intercept of the line that most closely fits the MOS data.

In adaptive bitrate (ABR) applications where there is a bitrate cap, a maximum allowable bitrate, the method may use a bitrate cap to refine the SABRE modeling scheme, with the consideration that any bitrate estimate that exceeds the bitrate cap will be clamped to the bitrate cap. For each video in the training set, one can compute the estimated bitrates $\hat{b}$ (380 in FIG. 3 or 445 and 495 in FIG. 4) that achieve a desired MOS value $\tilde{q}$ (350 in FIG. 3 or 440 and 490 in FIG. 4). In an example embodiment, the method may omit videos whose estimated bitrates $\hat{b}$ exceed the bitrate cap $b_{max}$ from the training set and the model is recalculated with the rest of the videos whose estimated bitrates fall below the bitrate cap. The reasoning for this is that, for videos whose estimated bitrates exceed the bitrate cap, the corresponding MOS data does not contribute positively to the model accuracy, since the data points capture behavior for larger bitrates that are irrelevant to the ABR application.

One may emphasize certain kinds of training data more than others in the model formation, based on user preferences. For example, the MOS training data vector q (220 in FIG. 2) may have some points with relatively high MOS values and others with relatively low values, and the user may prefer to emphasize higher-quality data more. In an embodiment, the method may de-emphasize certain components (e.g., lower-quality components) of the MOS training data vector q and the corresponding rows of the metric measurement matrix M (200 in FIG. 2) by giving them weights less than 1, while "regular" components of q and rows of M have weights equal to 1. The resulting model coefficient vector a (260 in FIG. 2) is then computed via weighted least squares instead of the standard least squares method when all weights are equal to 1.

Optimizing Encoding Settings Based on Perceptual Quality Metrics

Information from perceptual quality metric measurements may also be used to optimize encoding settings based on video characteristics. For example, the method may increase the number of B-frames in the encoding if the video is characterized as temporally "simple." In one embodiment, a video is characterized as temporally simple if its temporal complexity metric, as described above, or its motion vector statistics (such as average motion vector magnitude) indicate low motion. These statistics may be derived from lookahead processing. In another embodiment, temporal offset information from the TIM may be combined with motion vector statistics to refine the characterization of temporal simplicity.

In an embodiment, the method may adapt the number of threads used in parallel, multithreaded encoding based on the level of motion, since encoding quality under multithreaded encoding degrades more significantly for high-motion videos. For low-motion portions of the video, encoding may proceed with the maximum number of threads encoding multiple GOPs simultaneously. For medium-motion or high-motion portions of the video, encoding may proceed GOP-by-GOP (with parallel encoding of frames within a GOP) or even frame-by-frame (no parallel encoding at all).

In another set of embodiments, the method may change encoding settings and target bitrate in the middle of encoding a video so that encoding is optimized based on the varying content of different segments of the video. In one embodiment, the segments are determined by shot boundaries. In another embodiment, the segments are determined by the encoding group of pictures (GOP) structure or according to the segments in an adaptive bitrate scheme. In another embodiment, the segments are determined by the perceptual quality metric measurements. In another embodiment, the segments are determined according to user-defined "chunks" of data, as proposed in [Norkin, A. et al.; "More efficient mobile encodes for Netflix downloads," 2016, http://techblog.netflix.com/2016/12/more-efficient-mobile-encodes-for.html]. In a preferred embodiment, the method applies the SABRE scheme detailed above to the segments of a video, resulting in a set of recommended target bitrates, one for each segment.

Digital Processing Environment

Figure 6:
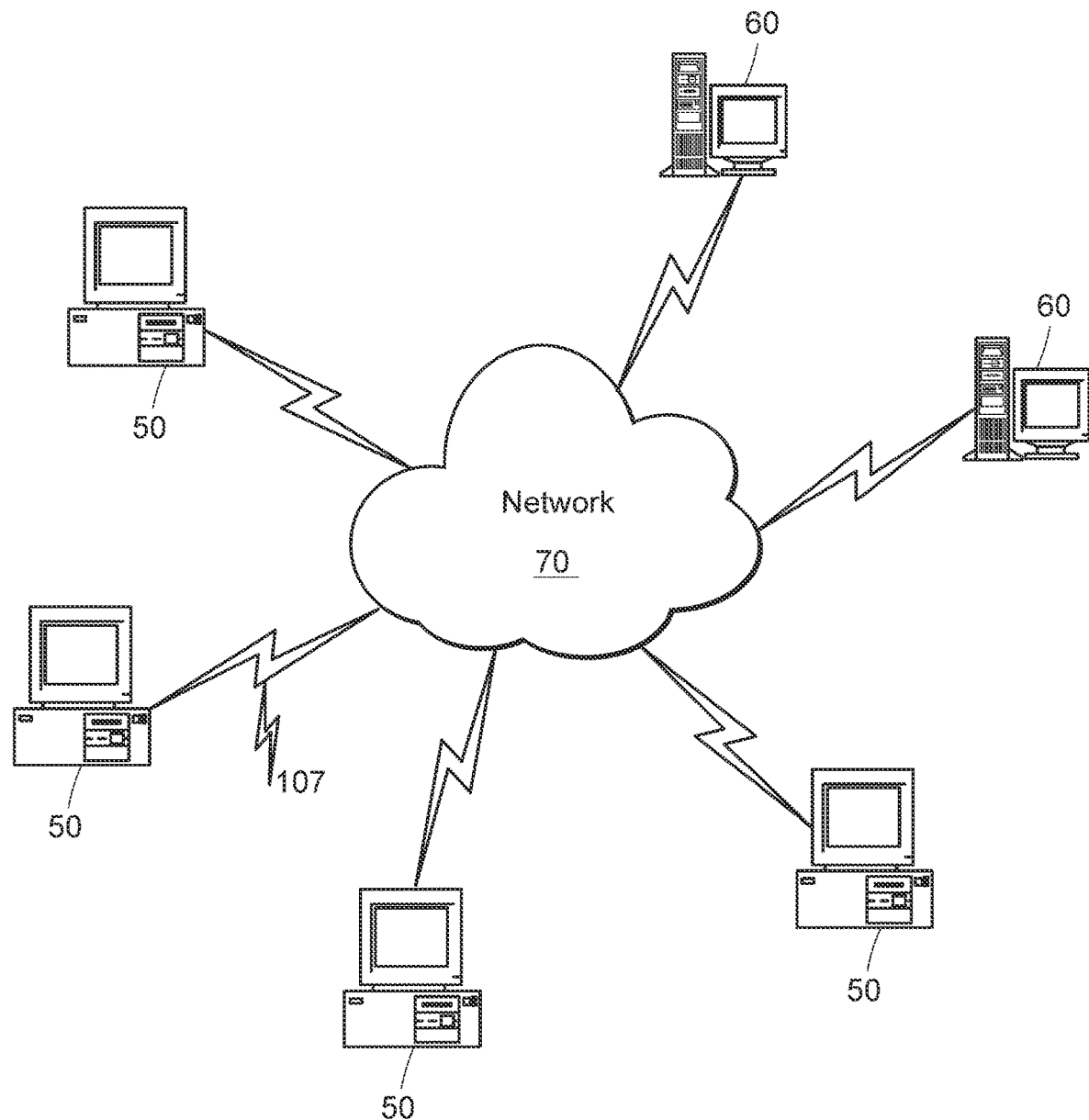
FIG. 6 is a schematic diagram of a computer network environment in which embodiments are deployed.

Example implementations of the present invention may be implemented in a software, firmware, or hardware environment. FIG. 6 illustrates one such environment. For example, the method/system described above (including FIGS. 1-5) may be implemented in the environment of FIG. 6. Client computer(s)/devices 50 (e.g., mobile phones or computing devices) and a cloud 60 (or server computer or cluster thereof) provide processing, storage, encoding, decoding, and input/output devices executing application programs and the like.

Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic devices/computer network architectures are suitable.

Figure 7:
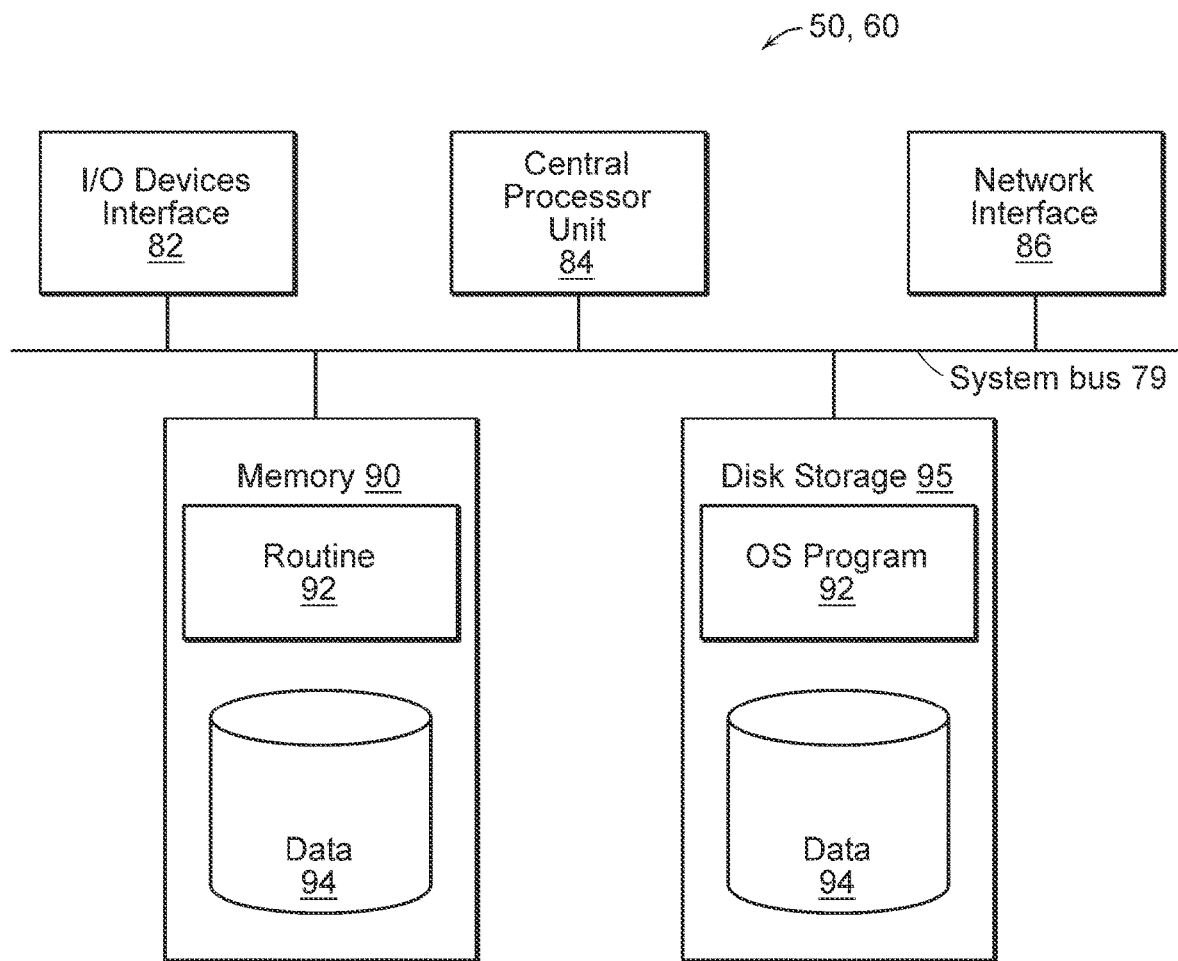
FIG. 7 is a block diagram of the computer nodes in the network of FIG. 6.

Embodiments of the invention may include means for encoding, tracking, modeling, filtering, tuning, decoding, or displaying video or data signal information. FIG. 7 is a diagram of the internal structure of a computer/computing node (e.g., client processor/device/mobile phone device/tablet 50 or server computers 60) in the processing environment of FIG. 6, which may be used to facilitate encoding such videos or data signal information. For example, method/system described above (including FIGS. 1-5) may be implemented by the computer/computing node of FIG. 7.

Each computer 50, 60 contains a system bus 79, where a bus is a set of actual or virtual hardware lines used for data transfer among the components of a computer or processing system. Bus 79 is essentially a shared conduit that connects different elements of a computer system (e.g., processor, encoder chip, decoder chip, disk storage, memory, input/output ports, etc.) that enables the transfer of data between the elements. Attached to the system bus 79 is an I/O device interface 82 for connecting various input and output devices (e.g., keyboard, mouse, displays, printers, speakers, etc.) to the computer 50, 60. Network interface 86 allows the computer to connect to various other devices attached to a network (for example, the network illustrated at 70 of FIG. 6). Memory 90 provides volatile storage for computer software instructions 92 and data 94 used to implement a software implementation of the present invention (e.g., codec: encoder/decoder).

Disk storage 95 provides non-volatile storage for computer software instructions 98 (equivalently "OS program") and data 94 used to implement an embodiment of the present invention: it can also be used to store the video in compressed format for long-term storage. Central processor unit 84 is also attached to system bus 79 and provides for the execution of computer instructions. Note that throughout the present text, "computer software instructions" and "OS program" are equivalent.

In one example, an encoder or other encoding system may be configured with computer readable instructions 92 that implement a method and/or system designed to predict the target (encoding) bitrate at which a given encoder encoding a given "target" video will produce desired mean opinion score (MOS). In another example, an encoder or other encoding system may be configured with computer readable instructions 92 that implement a method and/or designed to select videos for a training set that models video quality. In a further example, an encoder or other encoding system may be configured with computer readable instructions 92 that implement a method and/or system designed to determine an optimal subset of perceptual quality metrics for constrained bitrate encoding applications. In another example, an encoder or other encoding system may be configured with computer readable instructions 92 that implement a method and/or system designed to determine an optimal number of B-frames for encoding a video.

In one embodiment, the processor routines 92 and data 94 are a computer program product, with an encoder (generally referenced 92), including a computer readable medium capable of being stored on a storage device 94 which provides at least a portion of the software instructions for the encoder.

The computer program product 92 can be installed by any suitable software installation procedure, as is well known in the art. In another embodiment, at least a portion of the encoder software instructions may also be downloaded over a cable, communication, and/or wireless connection. In other embodiments, the encoder system software is a computer program propagated signal product embodied on a nontransitory computer readable medium, which when executed can be implemented as a propagated signal on a propagation medium (e.g., a radio wave, an infrared wave, a laser wave, a sound wave, or an electrical wave propagated over a global network such as the Internet, or other network(s)). Such carrier media or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for the computer program propagated signal product.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of determining an optimal subset of perceptual quality metrics and an optimal statistical model for bitrate encoding applications, the method comprising:
   computationally processing a plurality of perceptual quality metrics, a plurality of statistical models, a desired mean opinion score (MOS), and a mean opinion score (MOS) prediction error limit;
   analyzing test data to determine, for each video in a training set of videos, a true bitrate that achieves the desired mean opinion score (MOS), where each of the videos in the training set has a respective corresponding true bitrate, and the test data is derived from initial encodings from the training set of videos, the test data comprising initial mean opinion scores (MOS) assigned to the initial encodings and output bitrates from the initial encodings;
   encoding each of the videos in the training set at each of the respective corresponding true bitrates, resulting in encoded true bitrate videos;
   iteratively processing at least a portion of the plurality of perceptual quality metrics and at least a portion of the plurality of statistical models to computationally create at least one optimal subset of the plurality of perceptual quality metrics and the plurality of statistical models that maximize the average bitrate savings by:
      deriving, from a first subset of the plurality of perceptual quality metrics, a first subset of the plurality of statistical models, and first subset of at least one the initial encodings, a first derived model that predicts mean opinion scores (MOS) as a function of the subset of the plurality of perceptual quality metrics;
      using the first derived model, the first subset of the plurality of perceptual quality metrics, the first subset of the plurality of statistical models, and a first subset of the initial encodings, computationally determining first model bitrates that are proximate to the desired mean opinion scores (MOS);
      computing, for the first subset of the plurality of the perceptual quality metrics, for the first subset of the plurality of statistical models, and for each of the videos in the first subset of the videos in the training set, a first subset of bitrate errors representing a difference between a respective model bitrate and the respective corresponding true bitrate of each of the videos in the first subset;
      computing, for the first subset of the plurality of perceptual quality metrics and the first subset of the plurality of statistical models, an average bitrate savings across at least a portion of the encoded true bitrate videos, the average bitrate savings calculated by comparing the respective model bitrate to the respective corresponding true bitrate of each of the videos in the first subset; and
      comparing respective further subsets from the plurality of perceptual quality metrics and the plurality of statistical models with the first subset of the plurality of perceptual quality metrics and the first subset of the plurality of statistical models, respectively, to determine an optimal subset of at least one of the perceptual quality metrics from the plurality of the perceptual quality metrics and at least one of the plurality of statistical models, which produce the largest average bitrate savings, while incurring substantially no absolute mean opinion scores (MOS) prediction errors greater than the mean opinion scores (MOS) prediction error limit;
   wherein, the optimal subset produces a predicted mean opinion scores (MOS) close to the desired mean opinion scores (MOS) and maximizes the average bitrate savings subject to a constraint on the mean opinion scores (MOS) prediction error being less than the mean opinion score (MOS) prediction error limit.

2. The method of claim 1, wherein the absolute mean opinion score (MOS) prediction error limit is 0.1.

3. The method of claim 1, wherein underestimate of the mean opinion score (MOS) prediction error is limited to a specific limit.

4. The method of claim 1, wherein the plurality of statistical models are derived from at least one of: machine learning or statistical modeling.

5. The method of claim 4, wherein the plurality of statistical models further include at least one of: linear regression models, polynomial regression models, support vector regression (SVR) models, and random forest regression models.

6. The method of claim 4 wherein the plurality of statistical models are derived using a convolutional neural network for objective video quality assessment.

7. The method of claim 1, wherein the perceptual quality metrics are determined by:
   decoding the initial encodings to create decoded versions of the initial encodings; and
   computing the perceptual quality metrics from the decoded versions of the initial encodings.

8. The method of claim 7, wherein computing the perceptual quality metrics from the decoded versions of the initial encodings by determining the plurality of mean opinion scores (MOS) from the decoded versions of the initial encoding using at least one of the video processing metrics:
   Gradient Magnitude Similarity Deviation (GMSD) metric, Peak signal-to-noise ratio (PSNR), Perceptually Weighted Peak Signal-To-Noise Ratio (WPSNR), Video Multimethod Assessment Fusion (VMAF), Structural Similarity Index Measure (SSIM), or Multiscale Structural Similarity Index Measure (MS-SSIM).

9. The method of claim 1, wherein computationally estimating the respective first model bitrate for achieving the desired mean opinion score (MOS) further includes:
   (a) determining from the initial encoding an encoding bitrate;
   (b) computing a plurality of metrics on the initial encoding, plurality of metrics being from the first subset of the plurality of perceptual quality metrics;
   (c) applying the first derived model that predicts mean opinion scores (MOS) to predict a mean opinion score (MOS) for the initial encoding as a function of measurements of the plurality of metrics from the first subset;
(d) updating the encoding bitrate to encode and decode the source video based on a relationship between the predicted mean opinion score (MOS) and the desired mean opinion score (MOS); and
(e) iterating through said (a)-(d) until the predicted mean opinion score (MOS) is close to the desired mean opinion score (MOS), at which point an encoding bitrate converges to the respective model bitrate for achieving the desired mean opinion score (MOS).

10. The method of claim 1, wherein the selected optimal subset produces the largest average bitrate savings is used in a transcoding system to encode video that meets a target quality level without having a high bitrate.

11. The method of claim 1, wherein the first derived model is derived using the plurality of perceptual quality metrics and the plurality mean opinion scores (MOS) as training data to create a training model, such that the plurality of perceptual quality metrics and the plurality mean opinion scores (MOS) predict a mean opinion score (MOS).

12. The method of claim 1, wherein iteratively processing the plurality of perceptual quality metrics and the plurality of statistical models to computationally create at least one optimal subset of the plurality of perceptual quality metrics and the plurality of statistical models that maximize the average bitrate savings further includes:
deriving, from a second subset of the plurality of perceptual quality metrics, a second subset of the plurality of statistical models, and second subset of at least one the initial encodings, a second derived model that predicts mean opinion scores (MOS) as a function of the subset of the plurality of perceptual quality metrics;
using the second derived model, the second subset of the plurality of perceptual quality metrics, the second subset of the plurality of statistical models, and a second subset of the initial encodings, computationally determining second model bitrates that are proximate to the desired mean opinion score (MOS);
computing, for the second subset of the plurality of the perceptual quality metrics, for the second subset of the plurality of statistical models, and for each of the videos in the second subset of the videos in the training set, a second subset of bitrate errors representing a difference between a respective model bitrate and the respective corresponding true bitrate of each of the videos in the second subset;
computing, for the second subset of the plurality of perceptual quality metrics and the second subset of the plurality of statistical models, an average bitrate savings across at least a portion of the encoded true bitrate videos, the average bitrate savings calculated by comparing the respective model bitrate to the respective corresponding true bitrate of each of the videos in the second subset; and
comparing at least one of the perceptual quality metrics from the first and the second subsets of the plurality of the perceptual quality metrics and at least one of the plurality of statistical models to determine which of the first and the second subsets produce the largest average bitrate savings, while incurring substantially no absolute mean opinion scores (MOS) prediction errors greater than the mean opinion scores (MOS) prediction error limit.

13. The method of claim 1 wherein the selected optimal subset from the plurality of the perceptual quality metrics and statistical models are used in a bitrate encoding application.

14. A codec system comprising:
a codec stored on a non-transitory computer readable medium, the codec executed by at least one computer processor, causing the computer processor to perform bitrate encoding that includes determining an optimal subset of perceptual quality metrics and an optimal statistical model for bitrate encoding, the codec performing bitrate encoding including:
computationally processing a plurality of perceptual quality metrics, a plurality of statistical models, a desired mean opinion score (MOS), and a mean opinion score (MOS) prediction error limit;
analyzing test data to determine, for each video in a training set of videos, a true bitrate that achieves the desired mean opinion score (MOS), where each of the videos in the training set has a respective corresponding true bitrate, and the test data is derived from initial encodings from the training set of videos, the test data comprising initial mean opinion scores (MOS) assigned to the initial encodings and output bitrates from the initial encodings;
encoding each of the videos in the training set at each of the respective corresponding true bitrates, resulting in encoded true bitrate videos;
iteratively processing at least a portion of the plurality of perceptual quality metrics and at least a portion of the plurality of statistical models to computationally create at least one optimal subset of the plurality of perceptual quality metrics and the plurality of statistical models that maximize the average bitrate savings by:
deriving, from a first subset of the plurality of perceptual quality metrics, a first subset of the plurality of statistical models, and first subset of at least one the initial encodings, a first derived model that predicts mean opinion scores (MOS) as a function of the subset of the plurality of perceptual quality metrics;
using the first derived model, the first subset of the plurality of perceptual quality metrics, the first subset of the plurality of statistical models, and a first subset of the initial encodings, computationally determining first model bitrates that are proximate to the desired mean opinion score (MOS);
computing, for the first subset of the plurality of the perceptual quality metrics, for the first subset of the plurality of statistical models, and for each of the videos in the first subset of the videos in the training set, a first subset of bitrate errors representing a difference between a respective model bitrate and the respective corresponding true bitrate of each of the videos in the first subset;
computing, for the first subset of the plurality of perceptual quality metrics and the first subset of the plurality of statistical models, an average bitrate savings across at least a portion of the encoded true bitrate videos, the average bitrate savings calculated by comparing the respective model bitrate to the respective corresponding true bitrate of each of the videos in the first subset; and
comparing respective further subsets from the plurality of perceptual quality metrics and the plurality of statistical models with the first subset of the plurality of perceptual quality metrics and the first subset of the plurality of statistical models, respectively, to determine an optimal subset of at least one of the perceptual quality metrics from the plurality of the perceptual quality metrics and at least one of the plurality of statistical models, which produce the largest average bitrate savings, while incurring substantially no absolute mean opinion scores (MOS) prediction errors greater than the mean opinion scores (MOS) prediction error limit;

wherein, the optimal subset produces a predicted mean opinion scores (MOS) close to the desired mean opinion scores (MOS) and maximizes the average bitrate savings subject to a constraint on the mean opinion scores (MOS) prediction error being less than the mean opinion score (MOS) prediction error limit.

15. The codec system of claim 14, wherein the absolute mean opinion score (MOS) prediction error limit is 0.1.

16. The codec system of claim 14, wherein underestimate of the mean opinion score (MOS) prediction error is limited to a specific limit.

17. The codec system of claim 14, wherein the plurality of statistical models are derived from at least one of: machine learning or statistical modeling.

18. The codec system of claim 17, wherein the plurality of statistical models further include at least one of: linear regression models, polynomial regression models, support vector regression (SVR) models, and random forest regression models.

19. The codec system of claim 17 wherein the plurality of statistical models are derived using a convolutional neural network for objective video quality assessment.

20. The codec system of claim 14, wherein the perceptual quality metrics are determined by:
    decoding the initial encodings to create decoded versions of the initial encodings; and
    computing the perceptual quality metrics from the decoded versions of the initial encodings.

21. The codec system of claim 20, wherein the codec computing the perceptual quality metrics from the decoded versions of the initial encodings by determining the plurality of mean opinion scores (MOS) from the decoded versions of the initial encoding using at least one of the video processing metrics:
    Gradient Magnitude Similarity Deviation (GMSD) metric, Peak signal-to-noise ratio (PSNR), Perceptually Weighted Peak Signal-To-Noise Ratio (WPSNR), Video Multimethod Assessment Fusion (VMAF), Structural Similarity Index Measure (SSIM), or Multiscale Structural Similarity Index Measure (MS-SSIM).

22. The codec system of claim 14, wherein the codec computationally estimating the respective model bitrate for achieving the desired mean opinion score (MOS) further includes:
    (a) determining from the initial encoding an encoding bitrate;
    (b) computing a plurality of metrics on the initial encoding, plurality of metrics being from the first subset of the plurality of perceptual quality metrics;
    (c) applying the first derived model that predicts mean opinion scores (MOS) to predict a mean opinion score (MOS) for the initial encoding as a function of measurements of the plurality of metrics from the first subset;
    (d) updating the encoding bitrate to encode and decode the source video based on a relationship between the predicted mean opinion score (MOS) and the desired mean opinion score (MOS); and
    (e) iterating through said (a)-(d) until the predicted mean opinion score (MOS) is close to the desired mean opinion score (MOS), at which point an encoding bitrate converges to the respective model bitrate for achieving the desired mean opinion score (MOS).

23. The codec system of claim 14, wherein the selected optimal subset produces the largest average bitrate savings is used in a transcoding system to encode video that meets a target quality level without having a high bitrate.

24. The codec system of claim 14, wherein the first derived model is derived using the plurality of perceptual quality metrics and the plurality mean opinion scores (MOS) as training data to create a training model, such that the plurality of perceptual quality metrics and the plurality mean opinion scores (MOS) predict a mean opinion score (MOS).

25. The codec system of claim 14, wherein the codec iteratively processing the plurality of perceptual quality metrics and the plurality of statistical models to computationally create at least one optimal subset of the plurality of perceptual quality metrics and the plurality of statistical models that maximize the average bitrate savings further includes the codec:
    deriving, from a second subset of the plurality of perceptual quality metrics, a second subset of the plurality of statistical models, and second subset of at least one the initial encodings, a second derived model that predicts mean opinion scores (MOS) as a function of the subset of the plurality of perceptual quality metrics;
    using the second derived model, the second subset of the plurality of perceptual quality metrics, the second subset of the plurality of statistical models, and a second subset of the initial encodings, computationally determining second model bitrates that are proximate to the desired mean opinion score (MOS);
    computing, for the second subset of the plurality of the perceptual quality metrics, for the second subset of the plurality of statistical models, and for each of the videos in the second subset of the videos in the training set, a second subset of bitrate errors representing a difference between a respective model bitrate and the respective corresponding true bitrate of each of the videos in the second subset;
    computing, for the second subset of the plurality of perceptual quality metrics and the second subset of the plurality of statistical models, an average bitrate savings across at least a portion of the encoded true bitrate videos, the average bitrate savings calculated by comparing the respective model bitrate to the respective corresponding true bitrate of each of the videos in the second subset; and
    comparing at least one of the perceptual quality metrics from the first and the second subsets of the plurality of the perceptual quality metrics and at least one of the plurality of statistical models to determine which of the first and the second subsets produce the largest average bitrate savings, while incurring substantially no absolute mean opinion scores (MOS) prediction errors greater than the mean opinion scores (MOS) prediction error limit.

26. The codec system of claim 14 wherein the selected optimal subset from the plurality of the perceptual quality metrics and statistical models are used in a bitrate encoding application.

* * * * *